(12) United States Patent
March et al.

(10) Patent No.: US 8,874,534 B2
(45) Date of Patent: Oct. 28, 2014

(54) FILE STATE SUBSET SATELLITES TO PROVIDE BLOCK-BASED VERSION CONTROL

(75) Inventors: Roger March, Santa Clara, CA (US); Shivinder Singh Sikand, Soquel, CA (US)

(73) Assignee: IC Manage, Inc., Campbell, CA (US)

( * ) Notice: Subject to any disclaimer, the term of this patent is extended or adjusted under 35 U.S.C. 154(b) by 7 days.

(21) Appl. No.: 13/596,049

(22) Filed: Aug. 28, 2012

(65) Prior Publication Data

US 2012/0323869 A1 Dec. 20, 2012

Related U.S. Application Data

(63) Continuation-in-part of application No. 12/541,883, filed on Aug. 14, 2009.

(51) Int. Cl.
*G06F 17/30* (2006.01)
*G06F 11/14* (2006.01)

(52) U.S. Cl.
CPC .... *G06F 17/30212* (2013.01); *G06F 17/30132* (2013.01); *G06F 17/3023* (2013.01); *G06F 11/1435* (2013.01)
USPC .......................................................... 707/695

(58) Field of Classification Search
USPC .................... 707/681, 695; 709/212; 711/163
See application file for complete search history.

(56) References Cited

U.S. PATENT DOCUMENTS

| | | | |
|---|---|---|---|
| 2009/0327635 A1* | 12/2009 | Iyengar | 711/163 |
| 2010/0017496 A1* | 1/2010 | Kimmel et al. | 709/212 |
| 2010/0257142 A1* | 10/2010 | Murphy et al. | 707/681 |

* cited by examiner

*Primary Examiner* — Etienne Leroux
(74) *Attorney, Agent, or Firm* — PATENTRY

(57) ABSTRACT

A coherent file system and method of operation for a file state authority coupled to file state sub-set satellites addresses congestion and latency effects on a plurality of peer workstation clients organized in neighborhoods. Very large files are versioned and metadata recorded in a file state view determines which file blocks make up each version of a committed file. Metadata may be requested from neighboring workstations to locate desired file blocks. File block transmission is minimized to fulfill read requests only when not accessible at a workstation's local file block store.

14 Claims, 23 Drawing Sheets

FILE STATE SUBSET SATELLITES TO PROVIDE BLOCK-BASED VERSION CONTROL

RELATED APPLICATIONS

The present application is a continuation in part of Ser. No. 12/541,883 filed Aug. 12, 2009 by the same inventors which is incorporated in its entirety by reference.

BACKGROUND

In a large interdisciplinary engineering project spanning multiple timezones, each participant may require read-only access to thousands of files while retaining write authority to only a few hundred. Some of the files are related in a logical hierarchy while others are related in a physical hierarchy. Many of the files evolve over time and participants may at one time want access to the most recent version of a certain file and at others desire a stable collation. Thus the files that concern one participant will be different from another and multiple versions of a certain file may be appropriate for various roles.

Moreover concentration of files into centralized servers has been observed to increase congestion and lower both accessibility and reliability. Centralized servers require heavier investment in information technology and redundancy while duplicating storage.

Referring now to FIG. 1, it is known that a user 111 operating a workstation 112 may read and write files on a local file store 113 as well as on network attached file stores coupled to workstations 122 and servers 182. Lack of version control, poor security, and excessive disk usage are common byproducts of this architecture. Substantial congestion has been observed if all files are exclusively stored in a centralized server.

Thus it can be appreciated that what is needed is coherent management of all files committed to a project with distributed storage and improved data block accessibility.

BRIEF DESCRIPTION OF DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

SUMMARY OF THE INVENTION

A plurality of peer workstation clients first transmit only metadata about versions of files upon request and, subsequently, file blocks only when needed to fulfill a file block read of a particular version. A file state view at each workstation client enables access to file blocks of every version of each file which the user currently has in local store. A peer file system view at each workstation client enables access to file blocks of versions previously stored by other users and may be more or less out of date. A file state sub-set satellite collects metadata from a group of neighboring workstation clients. A plurality of file state sub-set satellites may exchange metadata among one another and answer a request from a workstation client who has gotten no response from its neighbors. A coherent file state authority receives via the sub-set satellites, all the metadata from all the workstation clients in the coherent file system but only transmits on exceptional circumstances e.g. disaster recovery, restoration, or initializing new satellites. Generally files are not distributed at all and only file blocks are transmitted upon request. Metadata about file states are optimized among peers and minimized up to or down from the coherent file state authority to reduce latency due to congestion.

DETAILED DISCLOSURE OF EMBODIMENTS

Reference will now be made to the drawings to describe various aspects of exemplary embodiments of the invention. It should be understood that the drawings are diagrammatic and schematic representations of such exemplary embodiments and, accordingly, are not limiting of the scope of the present invention, nor are the drawings necessarily drawn to scale.

Figure 1:
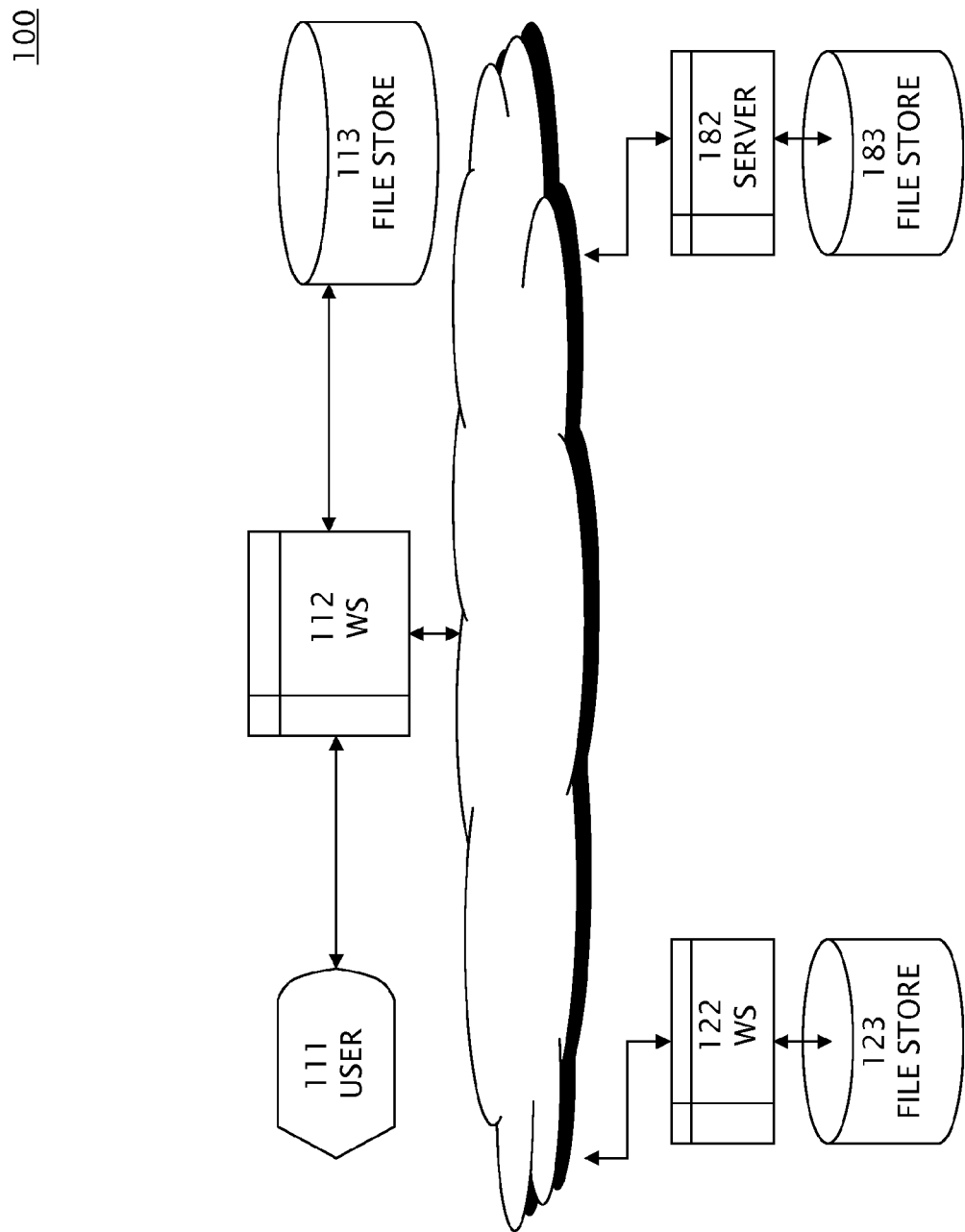
FIG. 1 is a block diagram of a conventional system operating over a network provided as background.
Figure 2:
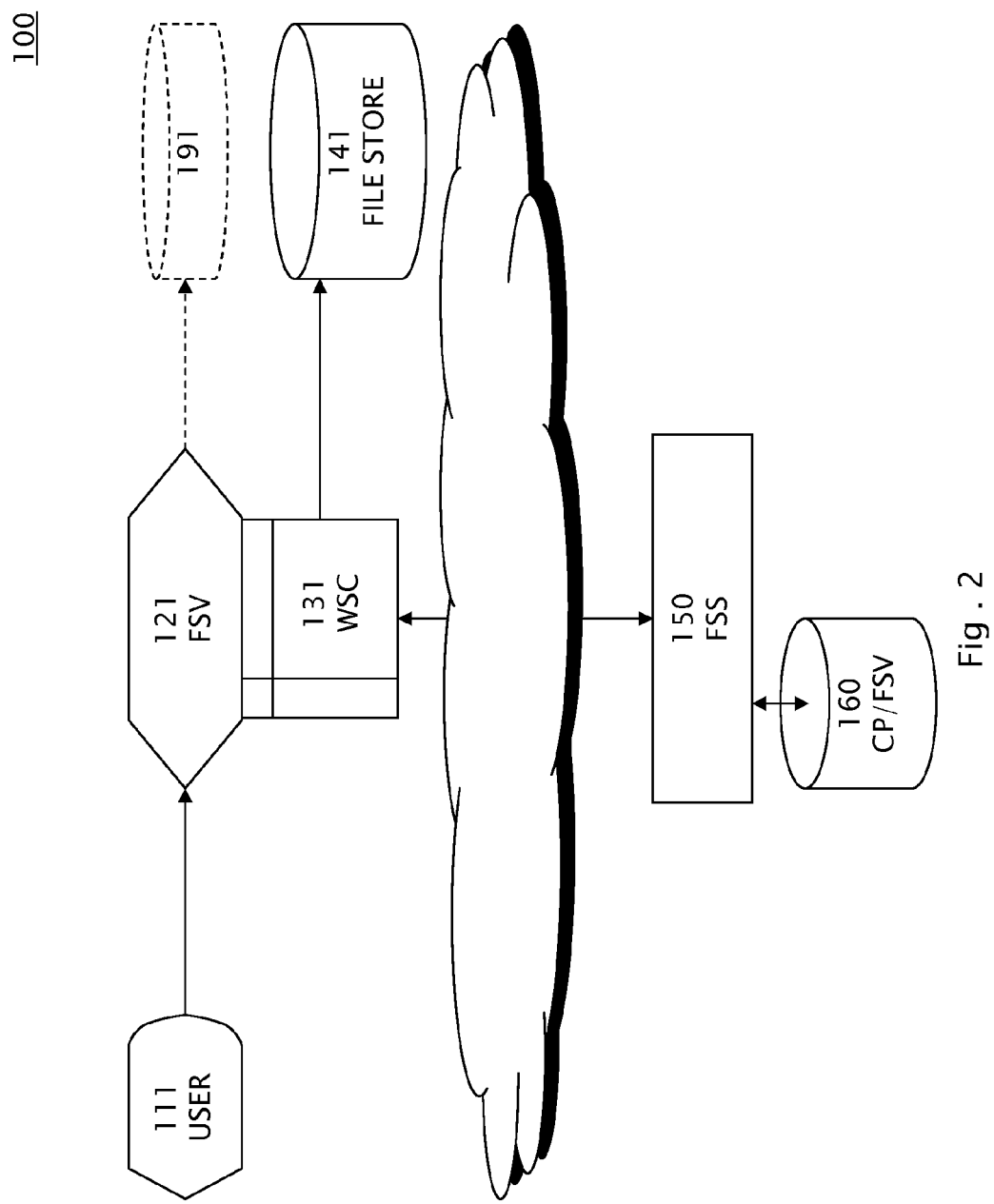
FIG. 2, 3, 4, 5, 6, are data flow diagrams of processes within a block diagram of involved components of a system operating over a network.

Referring now to FIG. 2, the present invention comprises a workspace client apparatus 131 coupled to a local file store 141, the workspace client apparatus comprising a file state view circuit 121 coupled to a user interface 111. The workspace client apparatus 131 is further coupled through a network to a file state server 150. The file state server comprises a content point store 160 for each file state view for each user.

The method of operating the workspace client apparatus is to present to the user a file system view of a virtual store 191. When a user commits a file in the file system view, the access is intercepted by the workspace client and in an example written to a locally attached file store 141. The workspace client further communicates the change in state to the file system server 150 which records the change in file state in the content point store 160 for this particular user's file state view and archives the new version. In an embodiment, the workspace client 131 also receives information about its peer workspace clients.

Figure 3:
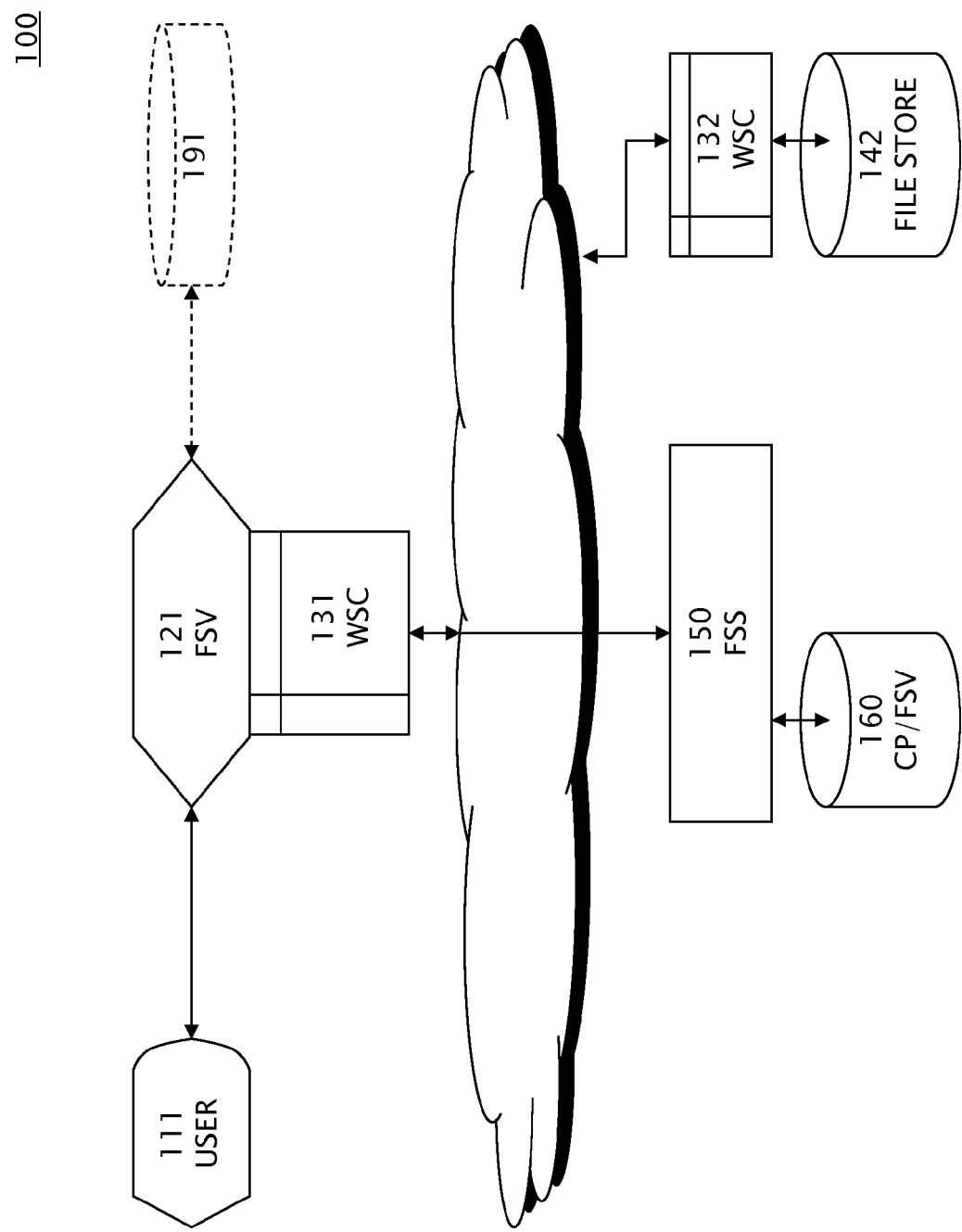

Referring now to FIG. 3, when a user 111 requires a block of a file that is accessible to him according to file state view 121 this access is intercepted and received by the workspace client 131 which queries the file state server for the current content point and change log serial. If not in file store 141, workspace client 131 transfers a request to workspace client 132 and receives the file.

Figure 4:
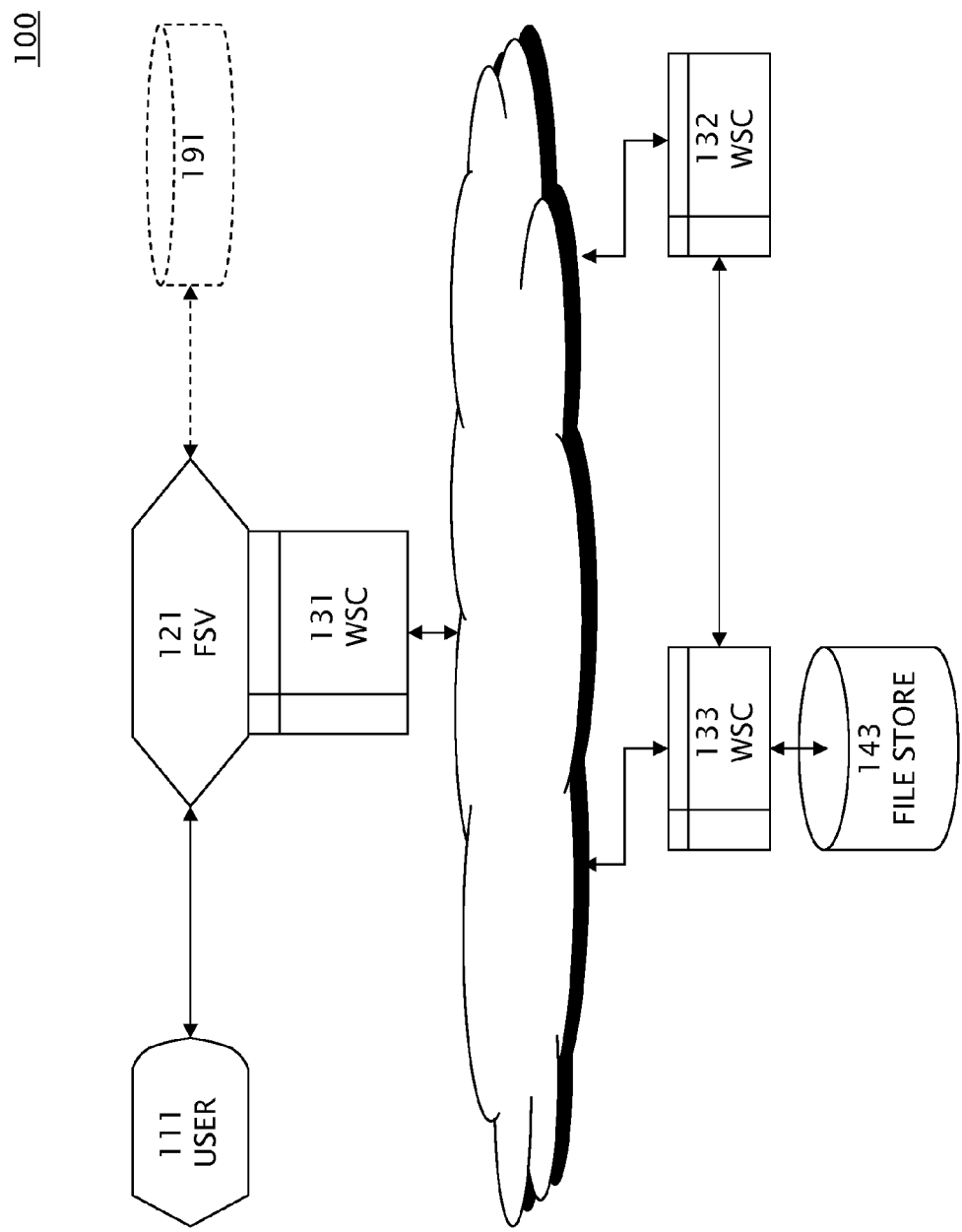

Referring now to FIG. 4, the method for operating a workspace client further comprises the step of exchanging further file system view information with peer workspace clients. In this illustration neither workspace client 131 nor workspace client 132 have the file requested by the user however workspace client 132 indicates that the desired file is located in the file store 143 attached to workspace client 133 which is requested and returned.

Figure 5:
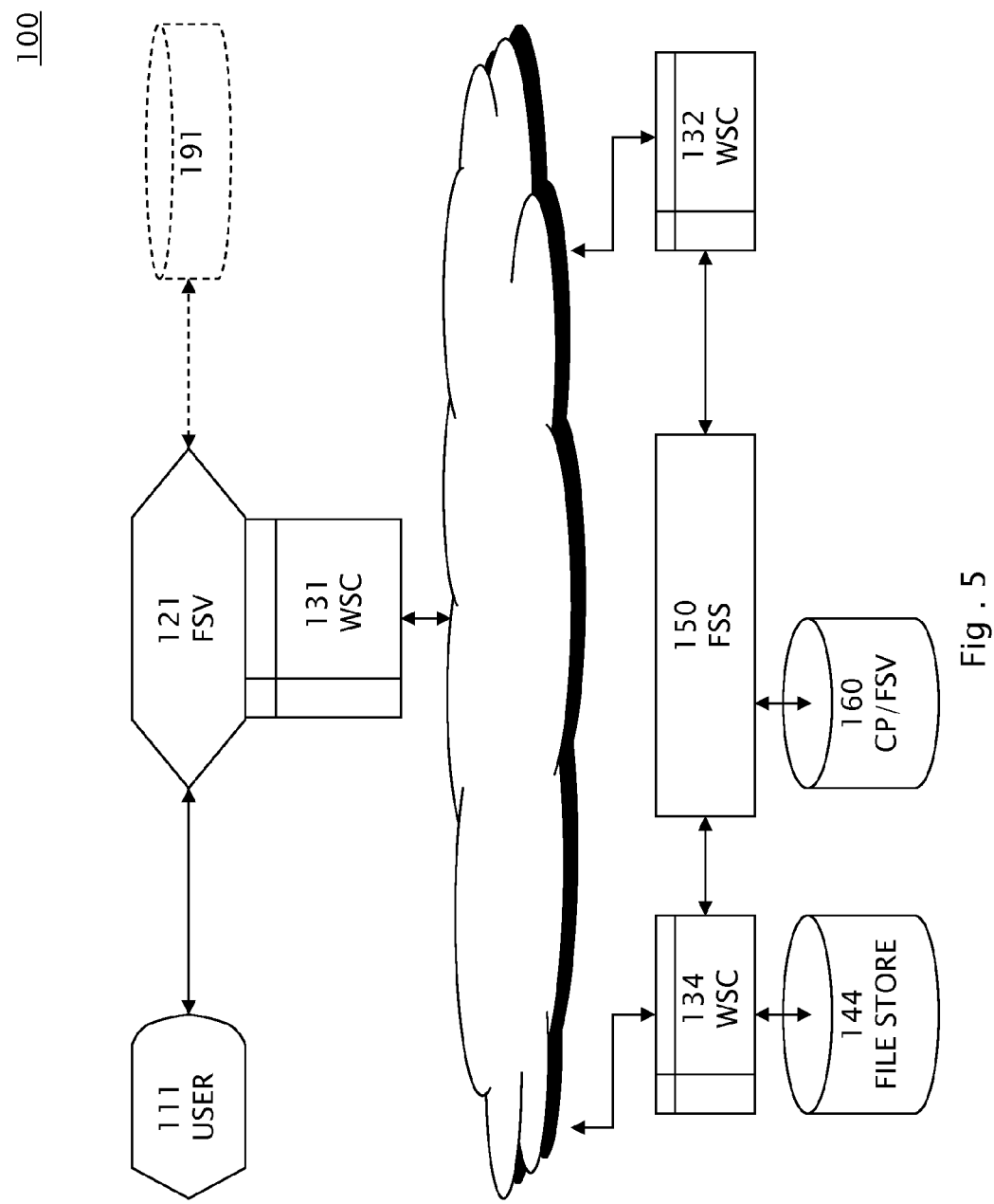

Referring now to FIG. 5, the method for operating a workstation client further comprises the step when no workstation client known to workstation client 131 can locate the requested file, asking the file state server 150 for another workspace client 134 to be queried. Only if unsuccessful in querying peers will the central archive be accessed.

Figure 6:
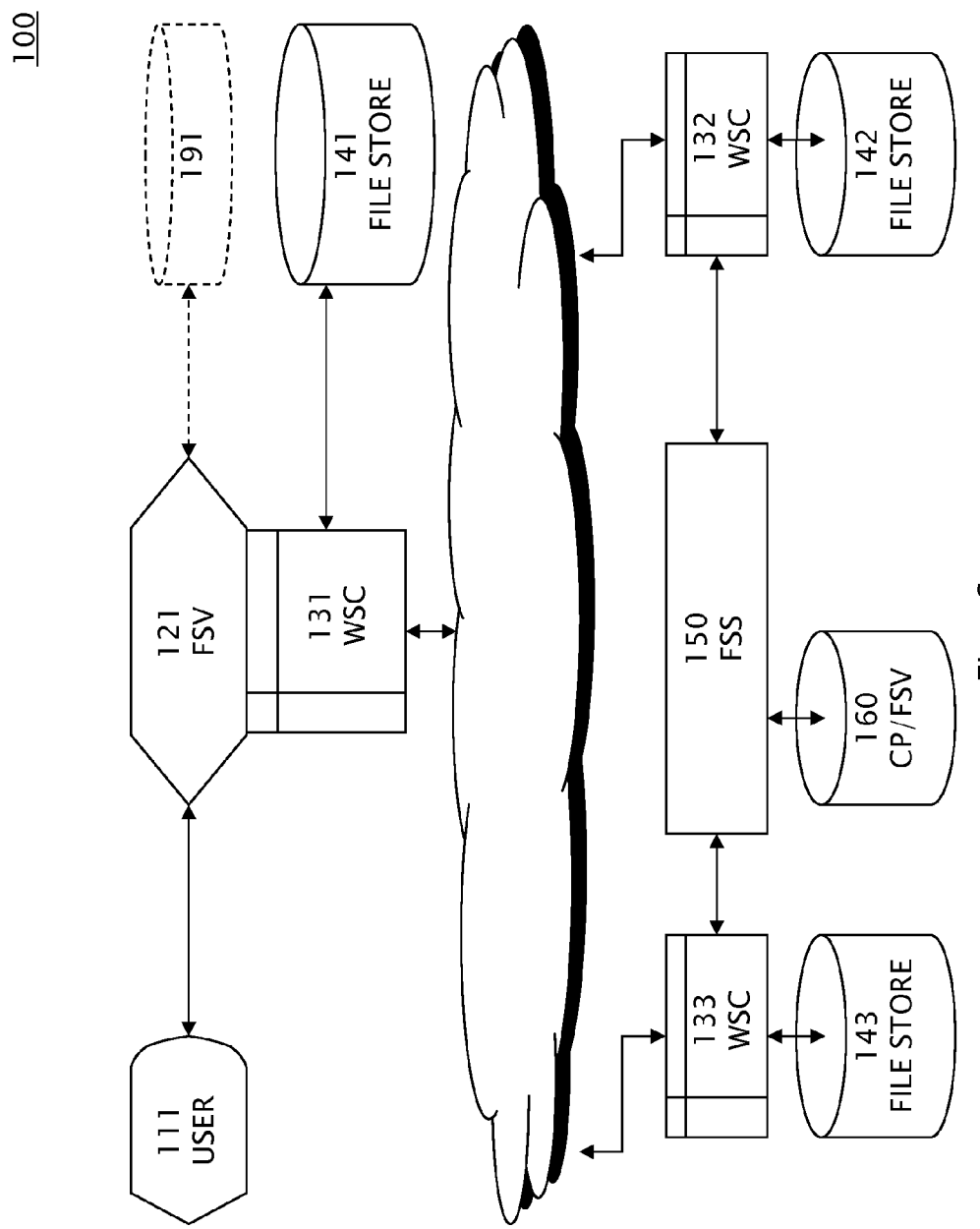

Referring now to FIG. 6, in an embodiment when files are located at a plurality of file stores different pieces of the file can be requested from each file store taking advantage of high-bandwidth to deliver parts of the file simultaneously. In an embodiment, a workspace client can determine to stash a file locally for redundancy and performance without making the file visible in the file state view of a certain user. In an embodiment, the file state server can maintain a plurality of content points for different users and control access through the file state views. The workspace client also removes inactive content points which are unneeded by any user i.e. not in its file state view. In an embodiment the present invention comprises a system for improved serving of versioned files to a plurality of users operating on a shared hierarchical file system comprising a network coupled to at least one file state server apparatus, the network further coupled to a plurality of workspace client apparatus wherein each workspace client apparatus comprises a local file store, a network adapter, a user interface, a file system view circuit, wherein the file system view circuit presents to each user a display of his pre-managed files, and managed files visible to all users, wherein managed files comprise change logs and content points; wherein a file state server apparatus comprises a network adapter, a temporal store, a temporal circuit, and a workspace client store wherein the temporal circuit receives and transmits the change logs and content points of each managed file and which content point are active for each file system view, and wherein the workspace client store receives and transmits the identities and network address of every attached workspace client apparatus.

The present invention comprises a method for operating a system comprising the steps: within each workspace client apparatus, exchanging with other workspace clients file information, responding to a request for a managed file from a workstation, presenting a file state view to a user, updating a file state server with state information for each file in the file state view. In an embodiment the present invention comprises a file state server apparatus comprising a processor coupled to a plurality of stores and to a network adapter, the processor adapted to maintain the temporal state of files in workspace clients. In an embodiment, a file state server apparatus further comprises a file store. In an embodiment the method for operating file state server comprises: providing likely candidate workspaces to provide the files, providing the files from its own file store, controlling the access rights for managed files, and updating workspace clients about changes in other workspace clients.

In an embodiment the file state server provides a managed file to a workspace client. In an embodiment a workspace client stores redundant file copies which are not presented to a file state view. The present invention is a method for operating a workspace client apparatus comprising the following processes: updating managed file information comprising: receiving information about workspace clients from other workspace clients receiving information about workspace clients from the file state server presenting a file system view of files managed by the file state server to all users, presenting a file system view of pre-managed files local to the workspace client only to the owner of a pre-managed file, providing managed files to other workspace clients, upon receiving a network request for a managed file from a peer workspace client, examining local file store for requested file, transmitting change log for requested file, transmitting content point for request file, transmitting identities of workspace clients known to have the requested file, exchanging updated file state views of managed files; upon receiving a local user file write storing the file to locally attached file store, if the file is a managed file, determining a change log to a content point, transmitting to a file state server apparatus the current file state, transmitting to a file state server apparatus the file store location, updating the file system view, and archiving a new version of the file; upon receiving a local user file read retrieving the file from locally attached store, if the file is a managed file not in locally attached file store, If possible, satisfies request from within its current holdings If possible, satisfies request from other workspace client, and otherwise, identifying another workspace client.

In an embodiment, the method for operating a workspace client further comprises receiving a change log for a file, receiving a content point for a file, receiving and combining file parts from a plurality of sources. In an embodiment the method for operating a workspace client further comprises: optimizing workspace client information exchange maintaining change logs over a finite range exchanging only incremental changes if possible and, otherwise, exchanging full state. In an embodiment, the method for operating a workspace client further comprises: choosing suitable peer workspace clients based on similar file system views to request blocks from, collecting statistics about performance and reliability of other workspace clients to prioritize block requests, and recording the frequency of network link failures to determine redundant resource gaps. In an embodiment, the network is an encrypted ssl tunnel.

Figure 7:
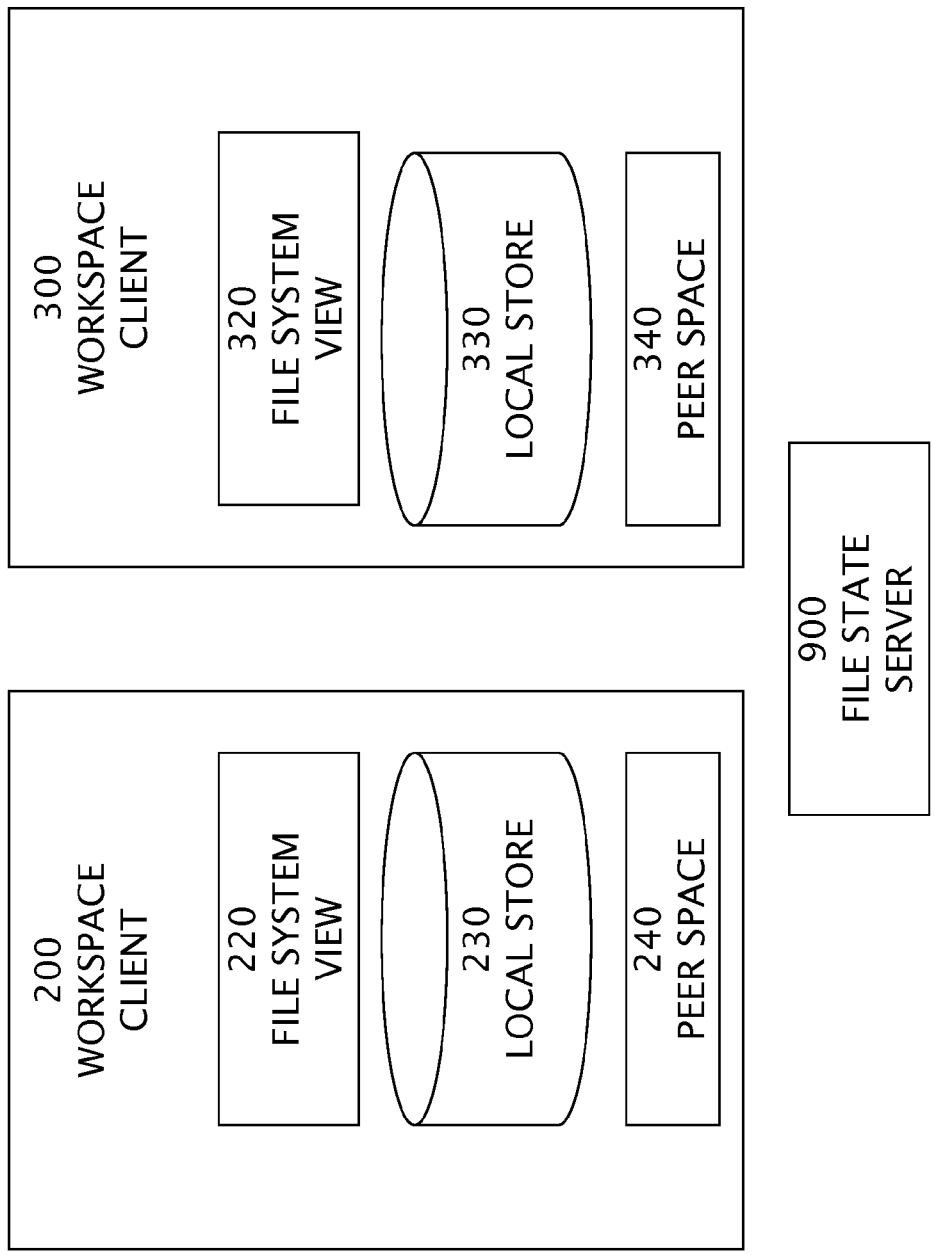
FIG. 7 is a hierarchical block diagram of components of apparatus in a system.

Referring to FIG. 7, an embodiment comprises a file state server 900 and a plurality of workspace client apparatuses 200, 300, . . . each workspace client apparatus comprising a local store, a file system view circuit, and a peer space circuit.

Figure 8:
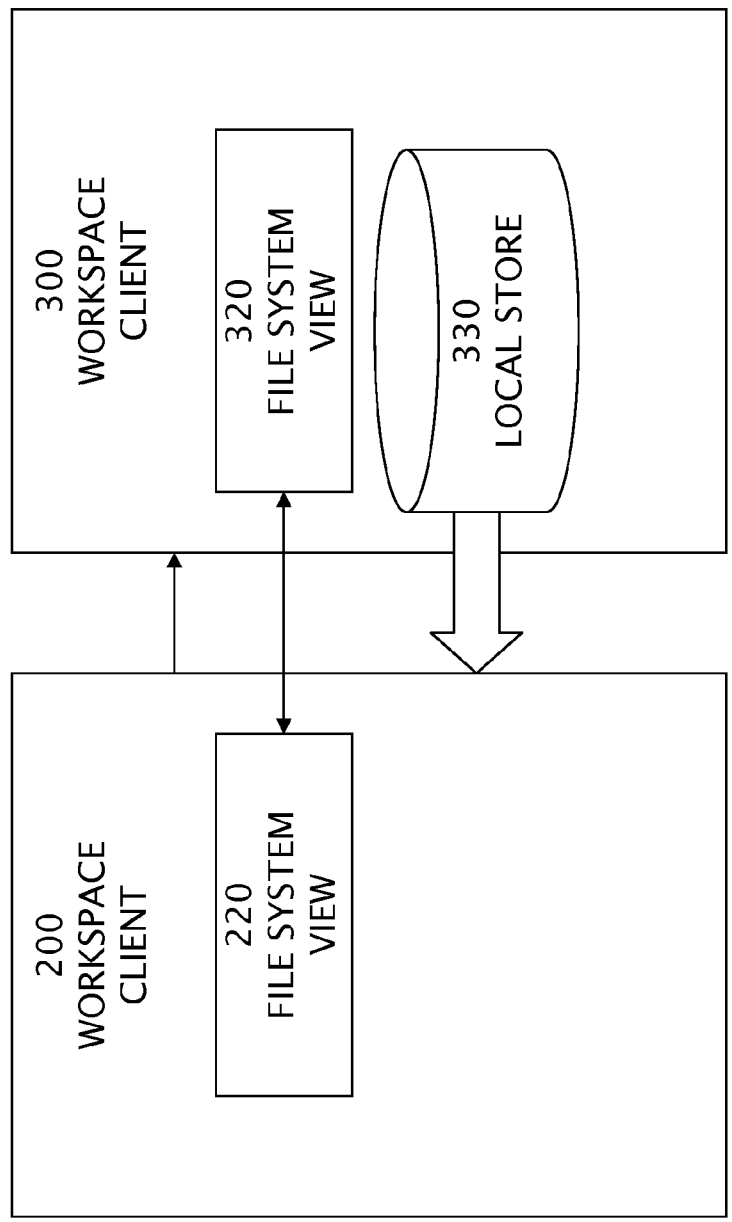
FIGS. 8, 9, 10, 11 and 12 are dataflow diagrams between blocks in a system illustrative of steps in a method.

Referring to FIG. 8, a method for operating a workspace client, comprises the steps following: recording each access by user to each file in file system view, removing least recently used files which are read only, receiving a request from a peer client apparatus for a certain block of a certain file, determining if the requested block is stored in the local store 330, if stored, transmitting the requested block to the peer client apparatus 200, and exchanging file system view updates between the workspace clients.

Figure 9:
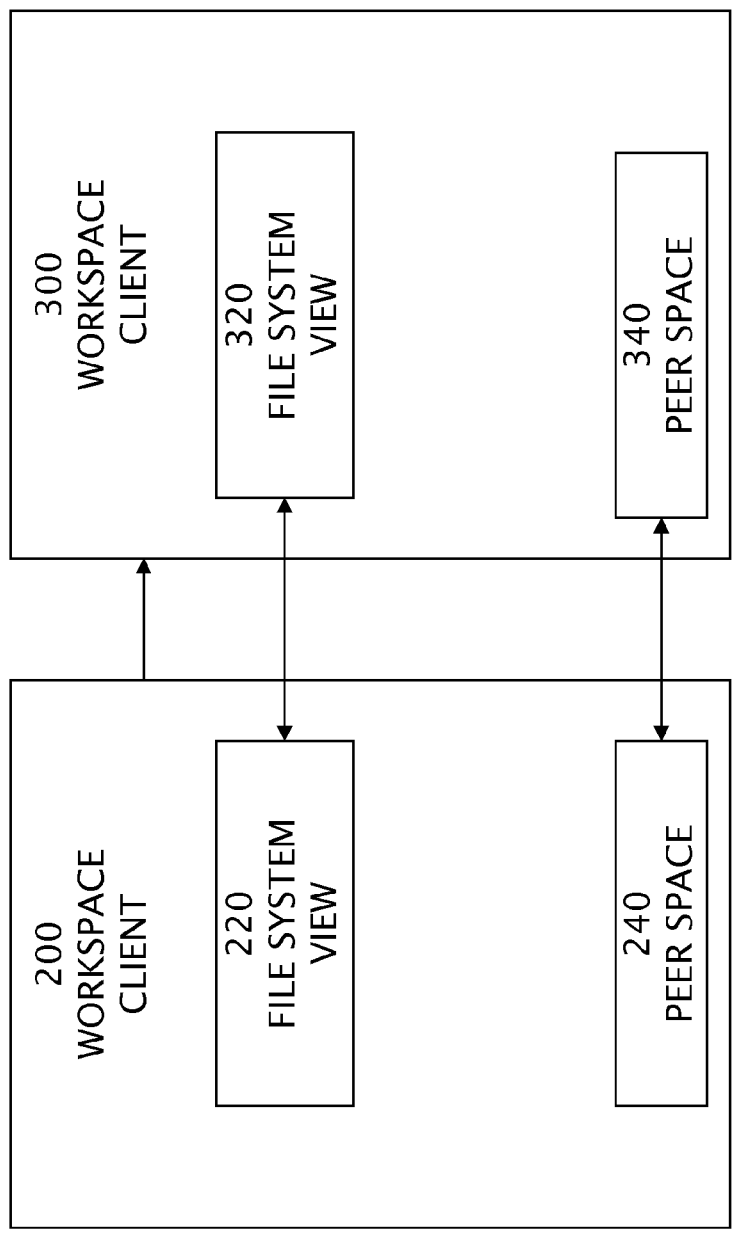

Referring to FIG. 9, in an embodiment, the method further comprises the step of exchanging peer space updates in the case that the workspace client determines that the requested block is not stored in the local store.

Figure 10:
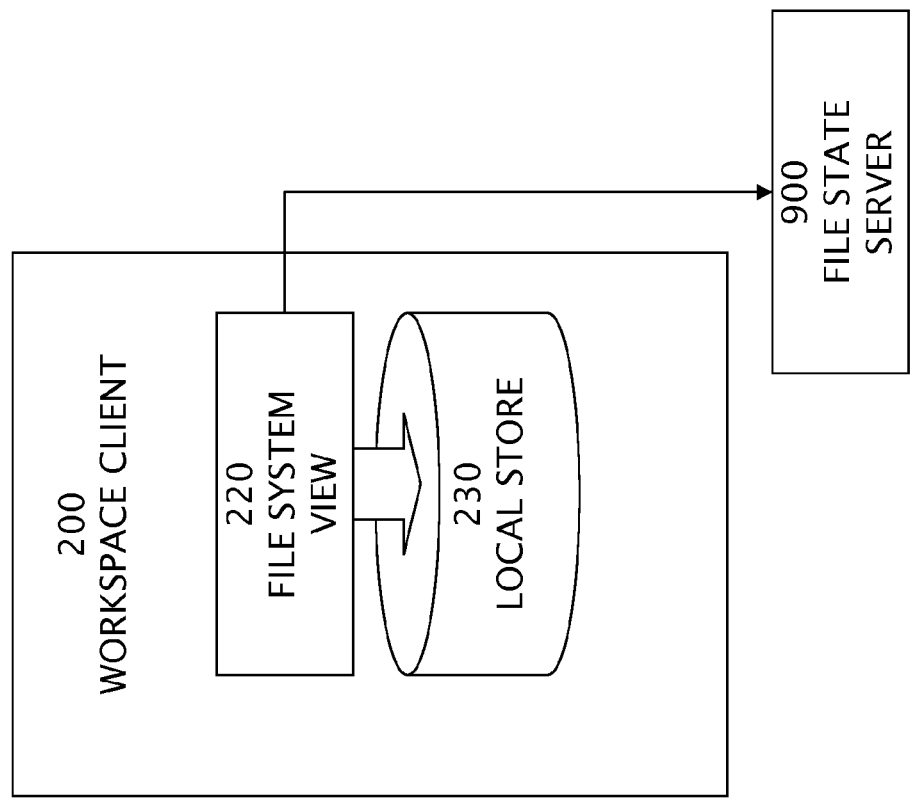

Referring to FIG. 10, a method for operating a system comprising a file state server 900 and a workspace client 200, comprises the steps: recording each access by a user to a file in file system view, removing from local store least recently used files, committing a new or changed file to local store 230, updating a file system view circuit 220 with a change log or initial content point of the file, and updating a file state server with the status of the new or changed file.

Figure 11:
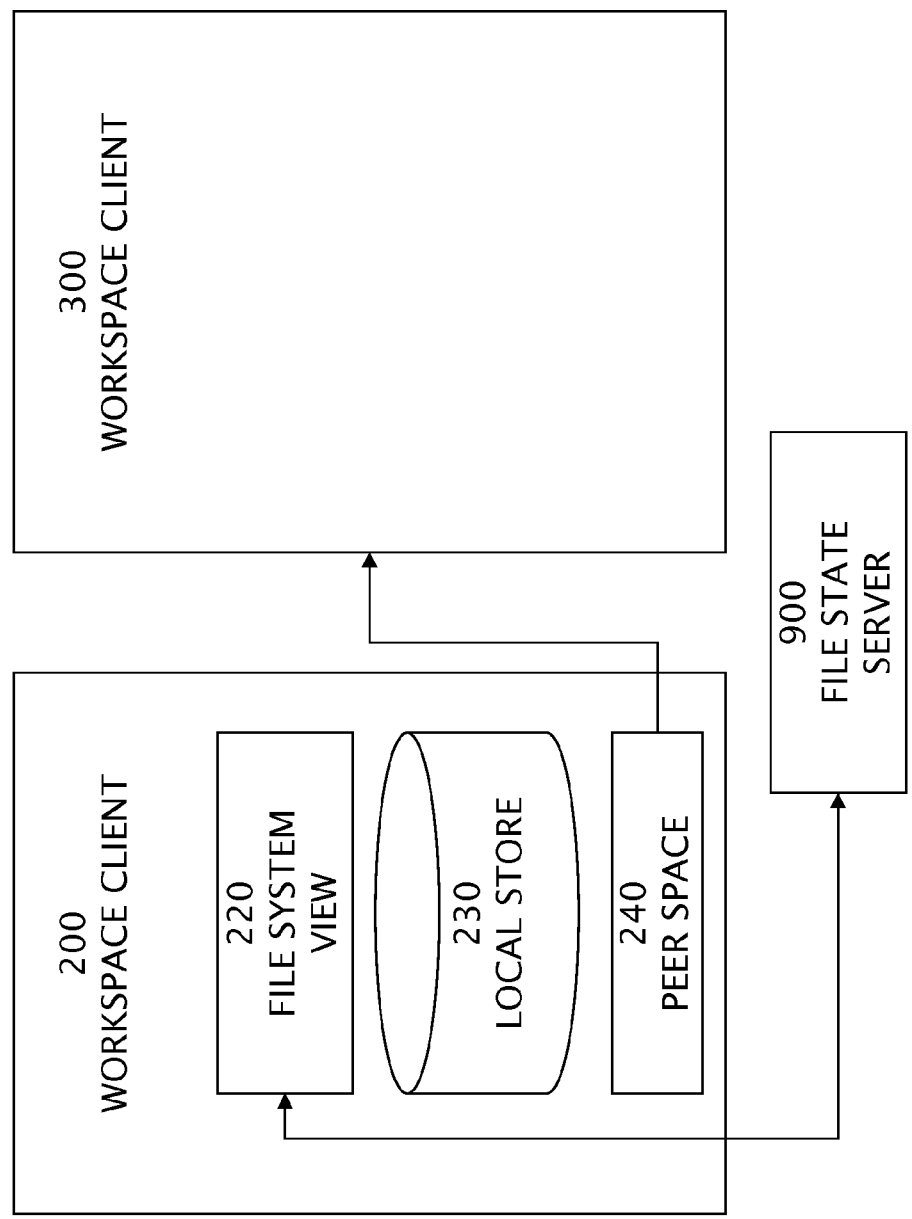

Referring to FIG. 11, the method for operating a system comprises the following steps within a second workspace client 300, receiving a request for a certain block from a peer workspace client 200, within a file state server 900, receiving a request from a first workspace client 200 and transmitting the current status of a certain file; within a first workspace client 200, intercepting at least one file block read requested by a user, requesting a current status of the file from the file state server 900, determining that at least one block of the current file is not within the local store 230, obtaining at least one candidate peer workspace client from a peer space circuit 240, and transmitting a block request to at least one peer workspace client 300.

Figure 12:
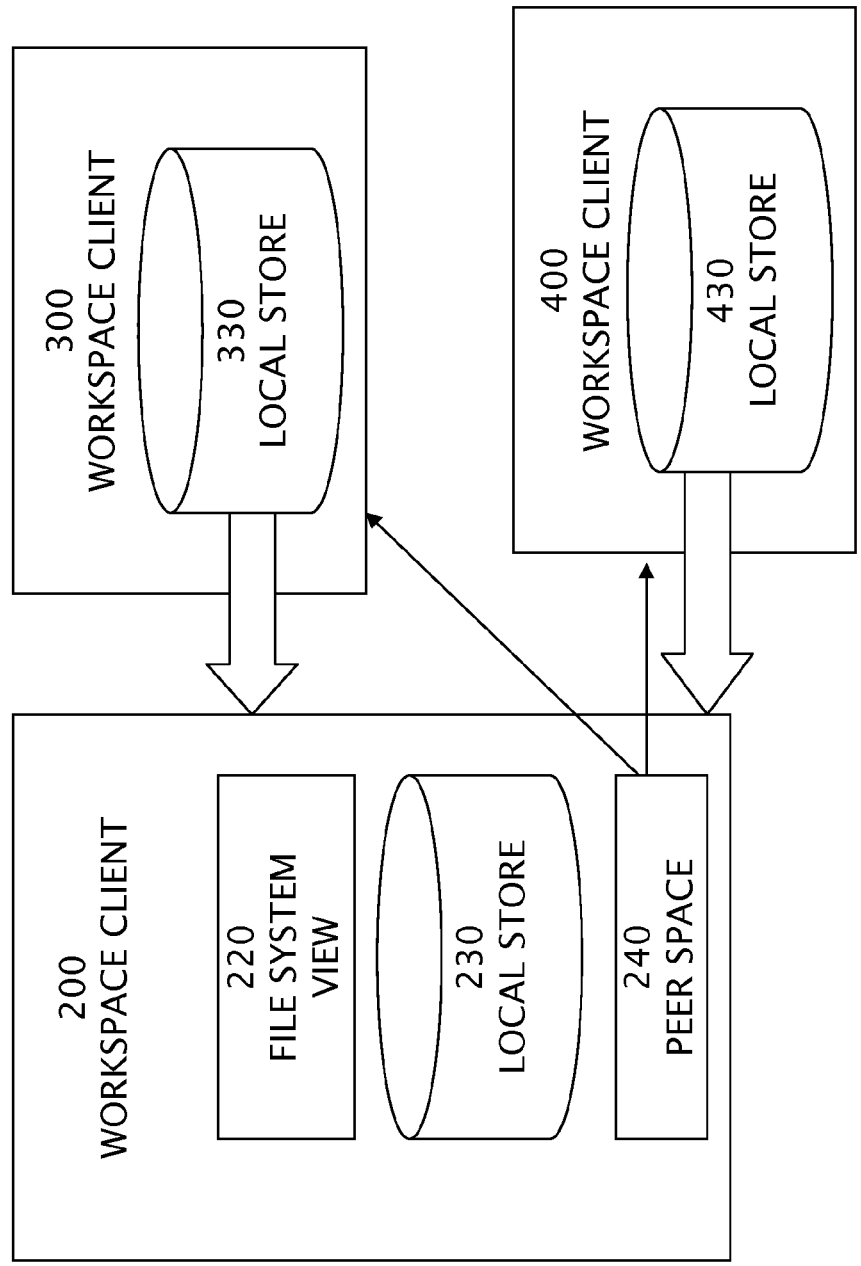
Figure 13A:
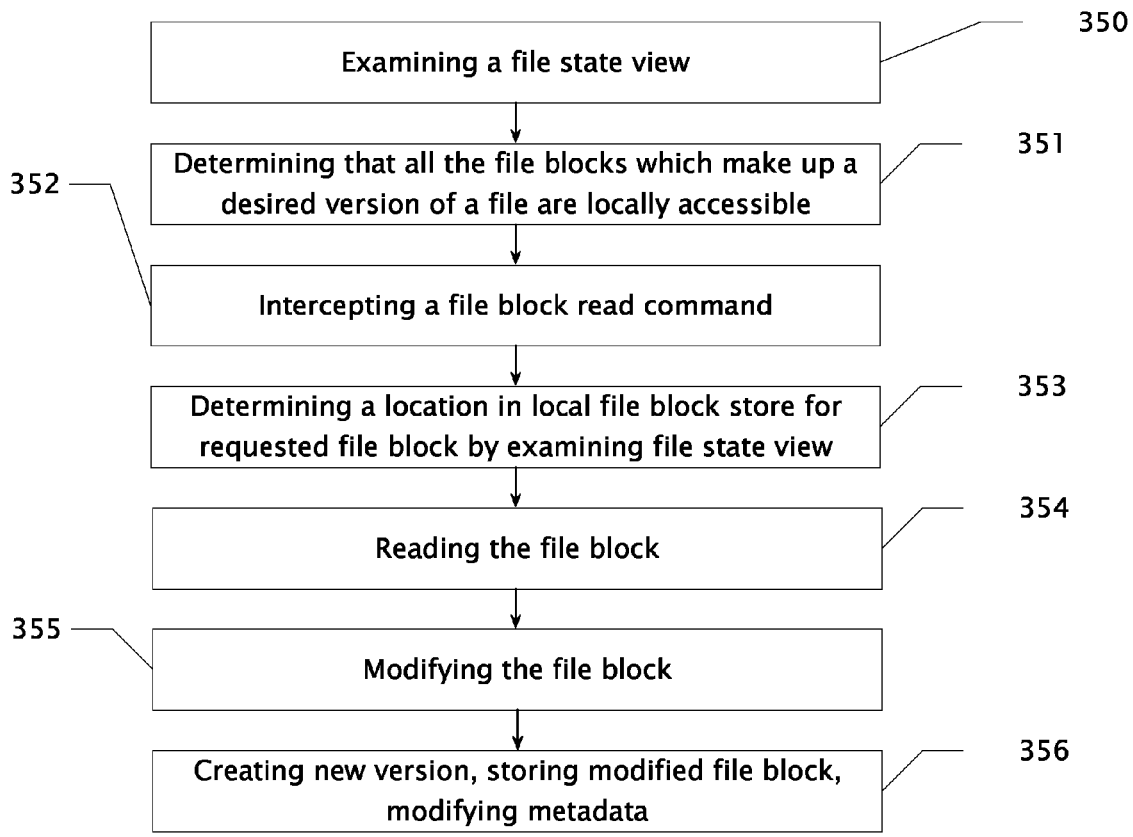
FIG. 13a-e is a flow chart of method steps.
Figure 13B:
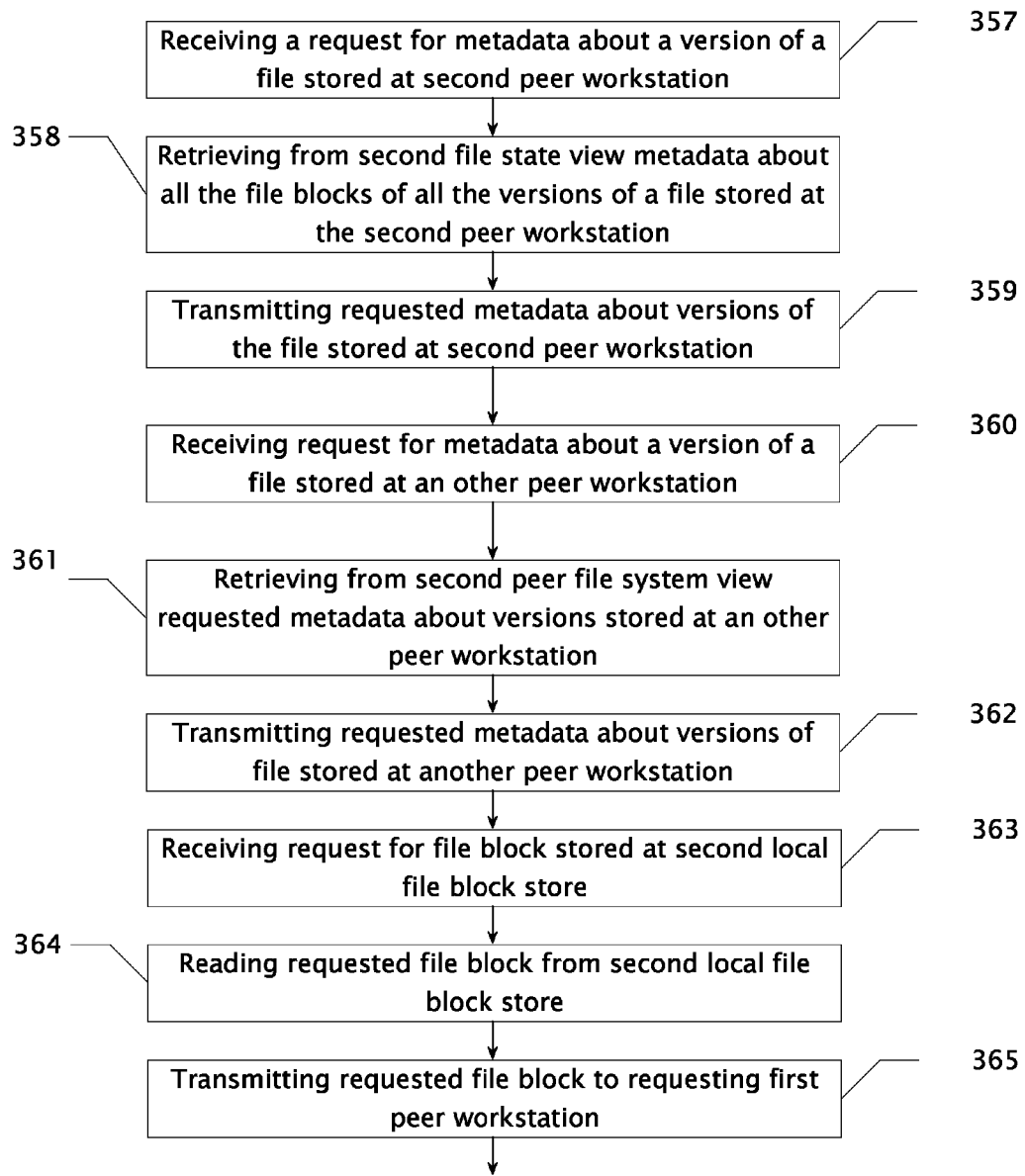
Figure 13C:
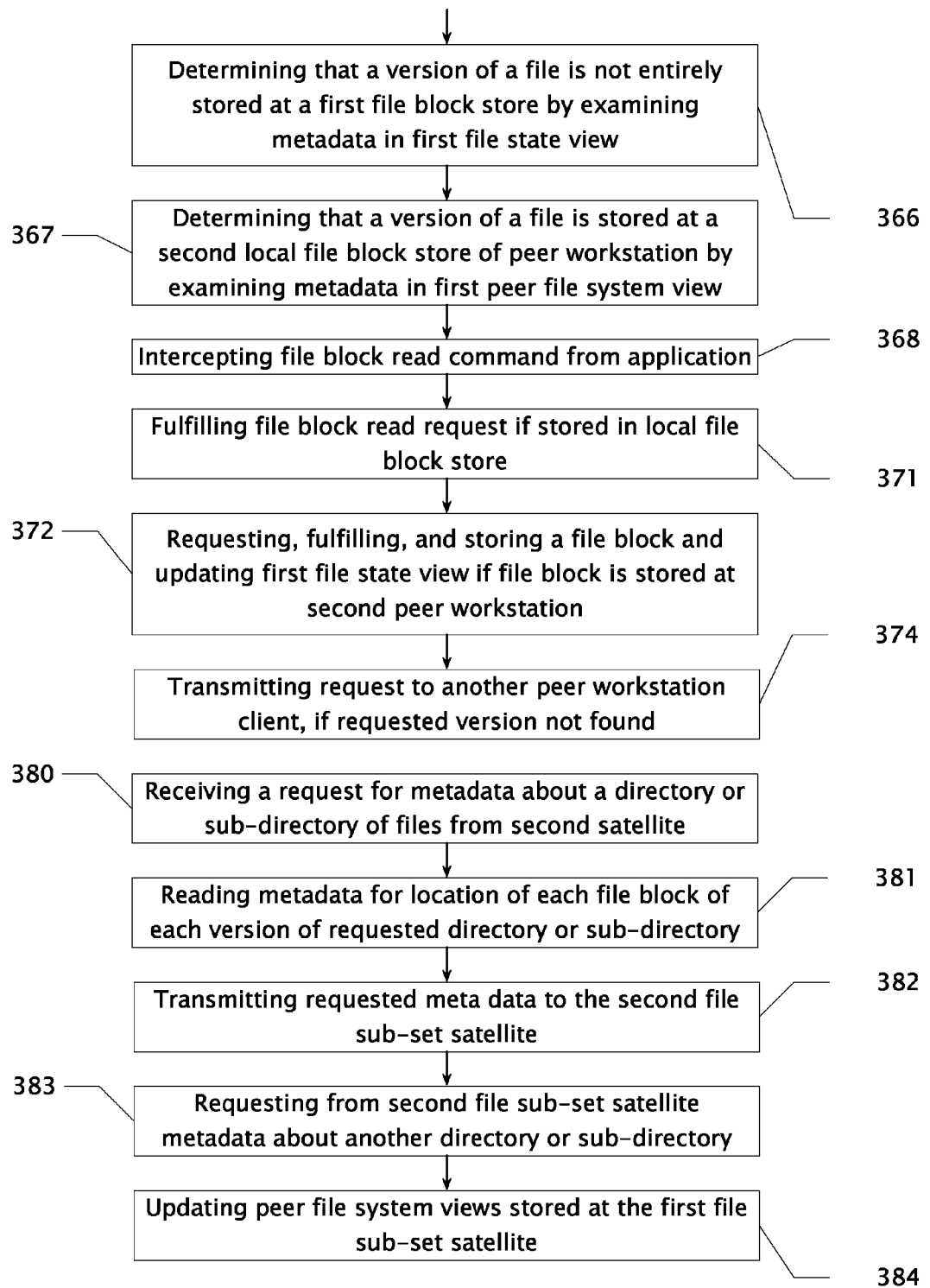
Figure 13D:
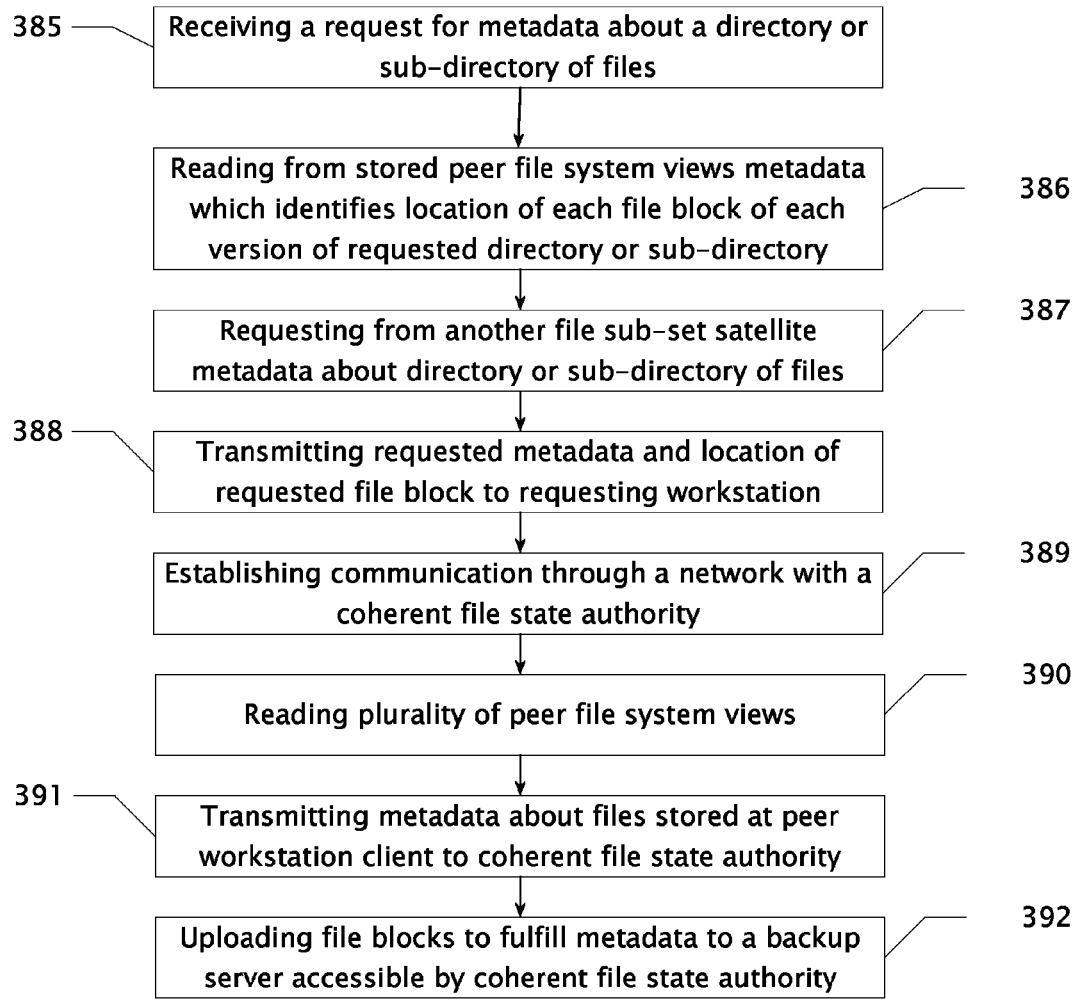
Figure 13E:
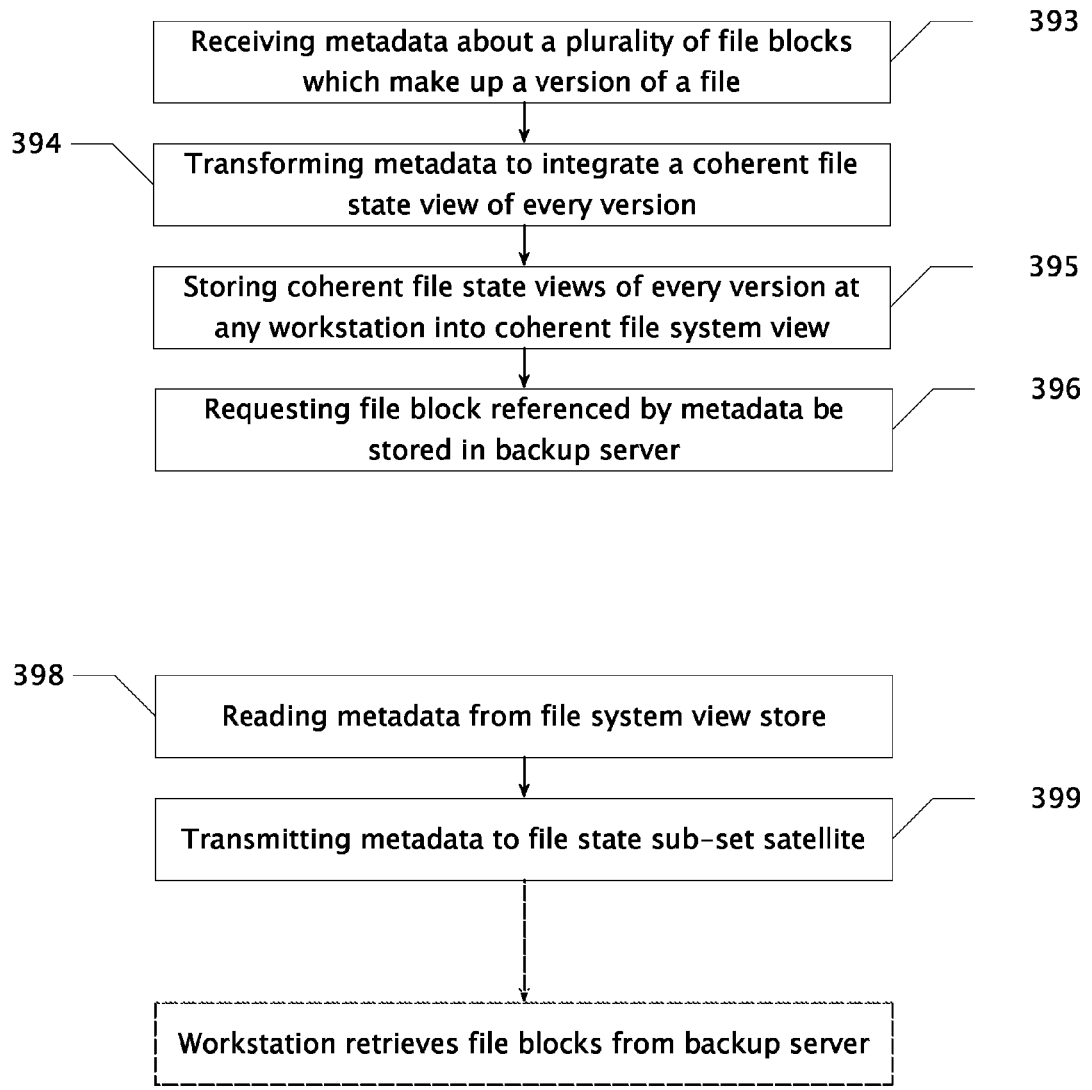

Referring to FIG. 12, in an embodiment, the method further comprises determining that a first block is not in local store 230 and a second block is not in local store 230, requesting a first block from a first peer workspace client 300; requesting a second block from a second peer workspace client 400; and integrating the blocks for the user of workspace client 200. In an embodiment, the method for operating a file state server comprises: receiving and storing each change in file system view from each workspace client, responding to a workspace client request with the current versions of each file. In an embodiment the method further comprises the step of responding to a first workspace client request with at least one peer workspace client not previously known to the first workspace client.

In an embodiment the method for operating a workspace client comprises: committing a file or modified file into a file system view, intercepting a block read request of a certain committed file, requesting the current revision number for a certain committed file from a file state server, determining if local store contains a current revision of a certain committed file, examining file system views of peer workspace clients to locate a current revision of a certain committed file, requesting transfer of a block of a certain committed file from a peer workstation client, recording each access to each file in file system view, and removing from local store a least recently used file.

Referring now to FIG. 13, one aspect of the invention is a method for operation of a workstation client in a coherent file system, the method comprising: determining that all the file blocks which make up a desired version of a file are locally accessible 351 by examining a file state view 350, intercepting a file block read command 352, determining a location in local file block store for the requested file block of the desired version of the file by examining the file state view 353, reading the file block 354, modifying the file block 355, and creating a new version of the file by writing the modified file block to local file block store and modifying metadata in the file state view to include the modified file block and its location in local file block store 356. As a result, metadata in the file state view associates all the accessible file blocks in the local file block store with at least one version of a file.

An other aspect of the invention is a method for operating a plurality of peer workstation client apparatuses in a coherent file system to minimize network traffic, the method comprising: at a second peer workstation client apparatus communicatively coupled to a first peer workstation client apparatus, receiving a request for metadata about a version of a file stored at the second peer workstation client apparatus 357, retrieving from a second file state view the requested metadata about all the file blocks of all the versions of a file stored at the second peer workstation client apparatus 358, transmitting the requested metadata about the versions of the file stored at the second peer workstation apparatus 359; receiving a request for metadata about a version of a file stored at an other peer workstation client apparatus 360, retrieving from a second peer file system view the requested metadata about any file blocks of any versions of the file stored at an other peer workstation client apparatus 361, transmitting the requested metadata about versions of the file stored at an other peer workstation client apparatus 362; receiving a request for a file block stored at a second local file block store 363, reading the requested file block from the second local file block store 364, and transmitting the requested file block to the requesting first peer workstation apparatus 365; at a first workstation client apparatus, determining that a version of a file is not entirely stored at a first local file block store 366 by examining metadata in a first file state view for metadata of file blocks, determining that a version of a file is stored at a second local file block store of the communicatively coupled second peer workstation client apparatus 367 by examining metadata in a first peer file system view, intercepting file block read commands from an application configuring the first peer workstation client apparatus 368, on the condition that the requested file block is stored in local file block store, fulfilling the file block read without network traffic 371, on the condition that the requested file block is stored in a second local file block store at a second peer workstation client apparatus, transmitting a request over a network, fulfilling the file block read with the response, storing the response to the first local file block store and updating the first file state view 372, on the condition that the requested version of the file is not found in either the first file state view or the first peer file system view, transmitting a request to at least one other peer workstation client apparatus for metadata about a directory or sub-directory of files and updating the first peer file system view with the response 374.

An other aspect of the invention is a method for operating a first file sub-set satellite apparatus communicatively coupled to a second file sub-set satellite apparatus, the method comprising: receiving a request for metadata about a directory or sub-directory of files 380, reading from a plurality of stored peer file system views the metadata which identifies the location of each file block that makes up each version of the requested directory or sub-directory of files 381, transmitting the requested metadata to the second file sub-set satellite apparatus 382, requesting from the second file sub-set satellite apparatus metadata about another directory or sub-directory of files 383, and updating the peer file system views stored at the first file sub-set satellite apparatus 384.

In an embodiment, operating a first file sub-set satellite apparatus communicatively coupled to a workstation client apparatus is improved by: receiving a request for metadata about a directory or sub-directory of files 385, reading from a plurality of stored peer file system views the metadata which identifies the location of each file block that makes up each version of the requested directory or sub-directory of files which it received from another file state sub-set apparatus 386, if not found, requesting from another file sub-set satellite apparatus metadata about said directory or sub-directory of files 387, and transmitting the requested metadata and location of the requested file block to the requesting workstation client apparatus 388.

In an embodiment, the method for operating a file state sub-set satellite of further includes the steps: establishing communication through a network with a coherent file state authority 389, reading a plurality of peer file system views from storage 390, transmitting metadata about files stored at a plurality of peer workstation clients communicatively coupled to the file state sub-set satellite to a coherent file state authority 391, and uploading file blocks required to fulfill the metadata to a conventional backup server accessible by the coherent file state authority 392.

In an embodiment the method of operating a coherent file system transforms the plurality of individual workstation file state views as follows: receiving from a file state sub-set satellite metadata about a plurality file blocks which make up a version of a file at one of the plurality of workstation clients 393, transforming the metadata to integrate a coherent file state view for every version of said file at every workstation client 394; storing said coherent file state view into a coherent file system view of every version of every file at any workstation client 395, and requesting a file block referenced by the metadata to be stored in conventional backup server storage 396.

In an embodiment, the method of operating a coherent file system is extended for recovery or reinitialization: reading metadata about a directory or sub-directory of files from file system view store 398, transmitting said metadata about each file block of each version of each file to a file state sub-set satellite apparatus 399. This enables, a conventional backup server to read upon request each file block necessary to fulfill any request for a file block of the file state sub-set metadata transmitted to the file state sub-set satellite, and transmits the requested file blocks to the file state sub-set satellite.

Figure 14:
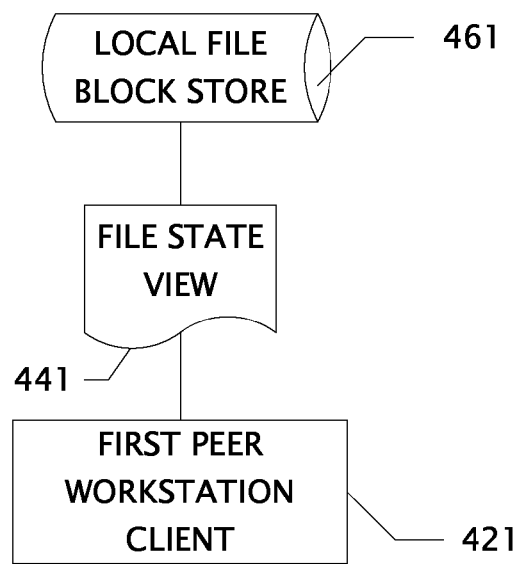
FIG. 14 is a block diagram of a single workstation client in a peer-to-peer network supporting a coherent file system.

Referring now to FIG. 14, one embodiment of the invention is a workstation client in a peer-to-peer network which maintains a file state view for each file which it commits into a coherent file system. The files for the intended functionality are very large and are made up of file blocks which are read, modified, and stored independently from other file blocks. Multiple versions of the file are retained for different purposes and a user of one workstation client may require access to different versions at one time. One or more file blocks may be read, modified, and stored to create a new version of a file.

A file state view circuit 441 tracks every file block stored in the local file block store 461 and provides metadata on which file blocks belong to each version and where the file blocks are located. A user has a workspace which includes every version of every file that he may read or modify. When a user operates a program product to read a file block of a version of a file, the workstation client determines from the metadata in file state view, which file block in local file block store corresponds to that version and fulfills the file block read command. When a user modifies a file and commits the modified file into the coherent file system, the metadata is changed in the file state view to create a new version which points to one or more new file blocks which contain the changes as well as to the file blocks which remain unchanged.

In an embodiment of the invention, a first peer workstation client apparatus 421 of a coherent file system comprises: a processor configured by computer executable instructions to store, retrieve, and transform data and to track versions of files which are made up of file data blocks and to intercept file block read and file block write commands issued by a program product; a file state view circuit 441 configured to create, store, and retrieve metadata about file blocks, the versions of files that each block is a component of, and the location of each block whereby file blocks that are identical in multiple versions of a file are not redundantly stored; a local file block store 461 for all file blocks that comprise versions of files whose metadata is stored in the file state view circuit 441.

Figure 15:
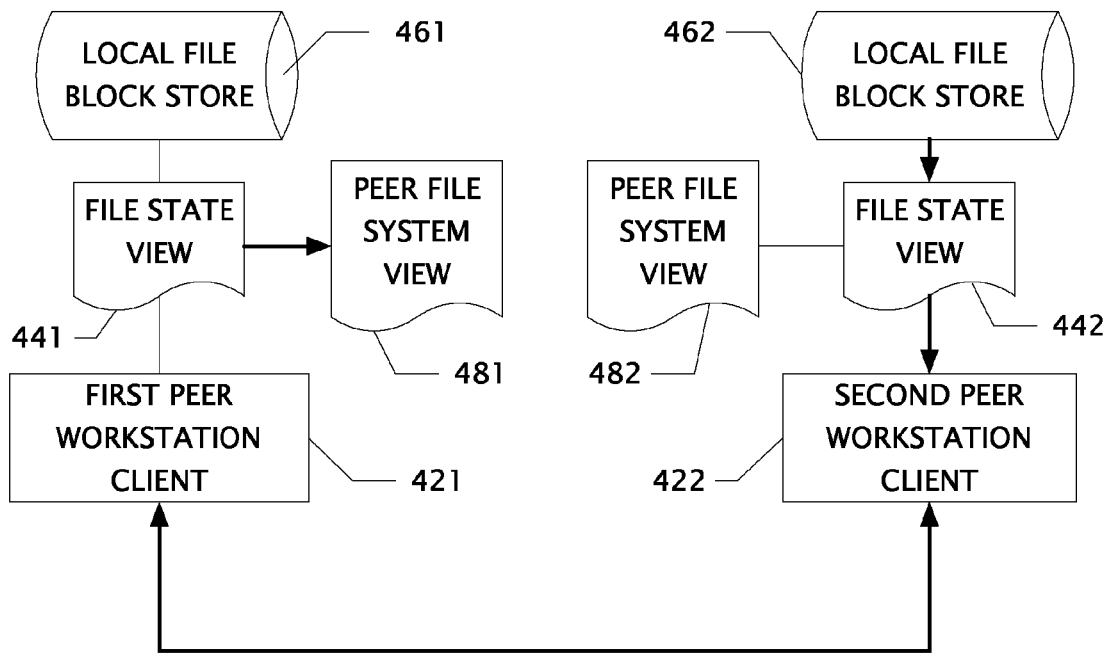
FIG. 15 is a block diagram of a pair of communicatively coupled peer workstation clients.

Referring now to FIG. 15, a coherent file system further comprises a plurality of peer workstation client apparatuses 421-422 communicatively coupled. Applicant herein defines these peer workstation clients as neighbors because they frequently communicate and assist one another by providing needed file blocks. Each peer workstation client apparatus manages its own local file block store 461-462.

Each workstation client apparatus maintains metadata about file versions it generates and stores in its own file state view 441-442. Files which are committed into the coherent file system by a user operating the second peer workstation client apparatus 422 have all its blocks stored into local file block store 462 and have the metadata that relates the file version to the file blocks stored in the file state view 442. A file may be stored in multiple versions on either one or a plurality of workstation client apparatuses. A version of a file may differ from another version of the same file by only one file block. A version of a file on the first peer workstation client may differ from another version of a file on the second peer workstation client entirely within one file block. Each workstation client apparatus has at least one peer file system view 481-482 which contains metadata about the files of peer workstation clients. The peer file system views may not be up-to-date while the file state views always must reflect every version of every file currently accessible in the local file block store.

Each workstation client apparatus may query its neighbors for updates of metadata concerning directories or sub-directories of files. Note that the files themselves or their blocks are not distributed to every other peer workstation client in the present invention because the files are enormous for the intended use and the individual file blocks that make up the files would consume scarce bandwidth to transfer unnecessarily. Neither the file system view metadata nor the file blocks are transmitted except upon request among the peer workstation clients.

On the condition when a file version is not found by a workstation client 421 in its own file state view 441, then the workstation client will check its peer file system view 481 for the desired version. Even then, no file blocks are transferred. Upon a file block read command of an application in the first peer workstation client, it may be determined by examining the metadata of the file version that the requested file block is already stored within the local file block store and can be fulfilled without network traffic. Applicant points out that entire versions of files are not unnecessarily transferred between peer workstations. Applicant points out that it is unnecessary to assemble and integrate all the file blocks of a version of a file from a plurality of peer workstations. Even if a workstation does not have a complete set of the file blocks of a desired version, it may still fulfill a file block read of a version which it does not have completely by providing a locally stored file block when the requested file block remained unchanged from one version to another. It is unnecessary to retrieve and integrate all the file blocks of a file when only one block is required.

On the condition that a file block read command requires a file block that is recorded in the peer file system view 481 to be located at the local file block store 482 of the second peer workstation client, a request will be transmitted and fulfilled across the network. In an embodiment, on the condition that metadata is not found for a file version in peer file system view 481 of the first peer workstation, a request will be transmitted for updated metadata to the second peer workstation client for metadata in its file state view 442 or peer file system view 482. Much as neighbors pass gossip around, the peer file systems views will converge over time but cannot constantly be as accurate as the file state view which each workstation client maintains for its own local file block store. In an embodiment, after requesting and fulfilling a file block request, the first or second or both peer workstation client apparatuses may request updated metadata on directories or sub-directories of files stored in their respective neighbor's file state view and peer file system views.

Figure 16:
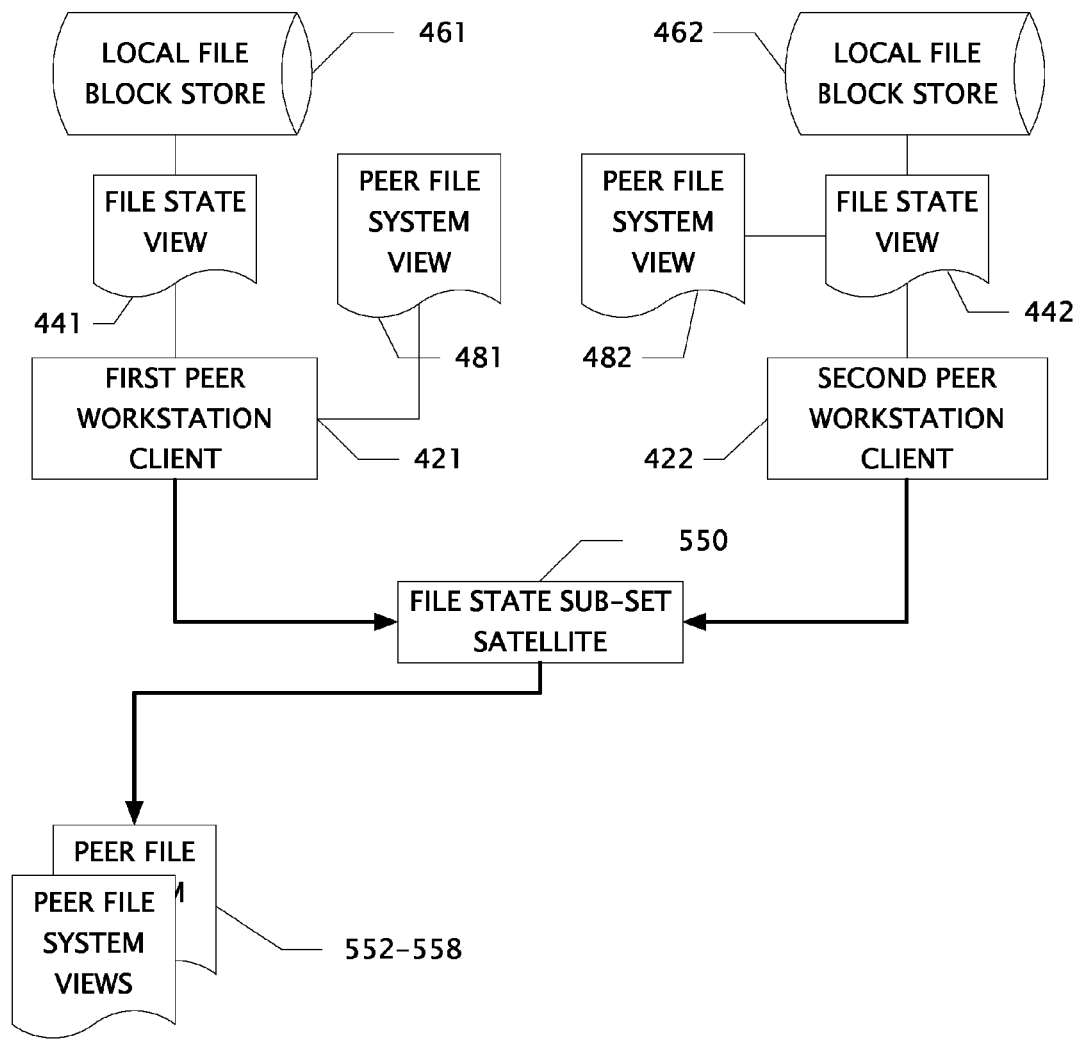
FIG. 16 is a block diagram of a plurality of workstation clients coupled to a sub-set satellite apparatus.

Referring now to FIG. 16, the coherent file system further comprises at least one file state sub-set satellite communicatively coupled to a plurality of peer workstation clients. The file state sub-set satellite apparatus comprises a store for a plurality of peer file system views 552-558. In an embodiment, the file state sub-set satellite passively monitors and records peer file system view metadata as it is transmitted among peer workstation clients on the same local area network. In an embodiment, each peer workstation client transmits to and the file state sub-set satellite receives a file state view and a peer file system view on a schedule or on demand or when it detects less congestion on the local network. In a preferred embodiment, each time a peer workstation client 421 modifies a versioned file and stores a file block into its local file block store 461, it updates its file state view 441 with the metadata about the new version and the file blocks which make up the new version and transmits the metadata and at least one modified file block to the file state sub-set satellite. To avoid congestion and resulting latency, the file state sub-set satellite apparatus is not described as a server because the peer workstation client primarily talk among themselves to retrieve file blocks as needed and primarily transmit to but do not receive metadata from the file state sub-set satellite apparatus.

Figure 17:
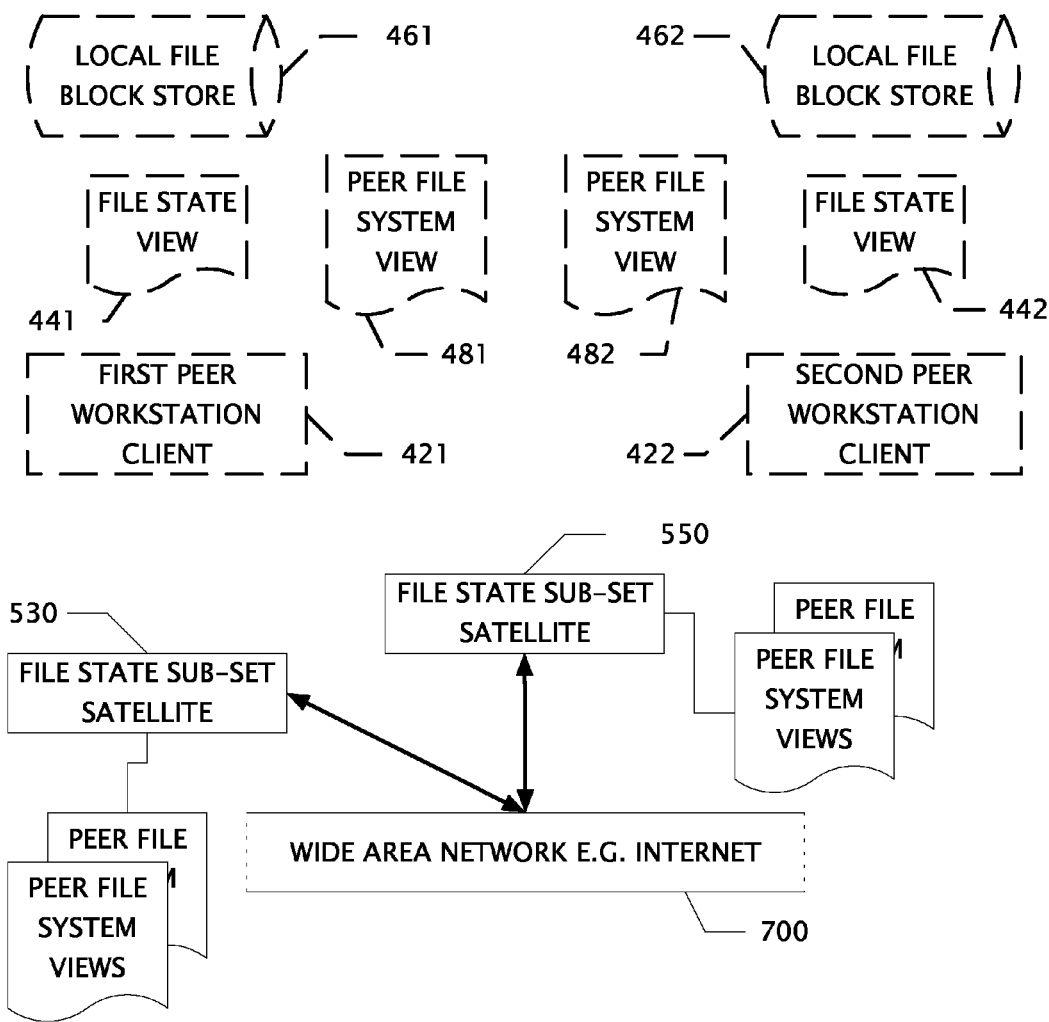
FIG. 17 is a block diagram of a pair of communicatively coupled sub-set satellites.

Referring now to FIG. 17, a plurality of file state sub-set satellite apparatuses 530-550 are communicatively coupled through a network 700 appropriately referred to as the Internet. Each file state sub-set satellite apparatus is coupled to a sub-set of the workstation client apparatuses participating in the coherent file system and therefore has a sub-set of the file states of the files within the coherent file system. Each file state sub-set satellite apparatus 530 may transmit a request for and receive from any other file state sub-set satellite apparatus 550 metadata about a directory or sub-directory of files. This request does not demand the file blocks which make up the files. Applicant emphasizes that only metadata is being requested and transmitted among the file state sub-set satellite apparatuses 530-550. In the event that a workstation client apparatus is unable to locate all of the blocks desired of a version of a file in its own file state view and its peer file system view of its neighbors and none of its neighbors responds to a query for the desired file block, then the workstation client may inquire if its file state sub-set satellite has received metadata of the file block and its location from another file state sub-set satellite.

Figure 18:
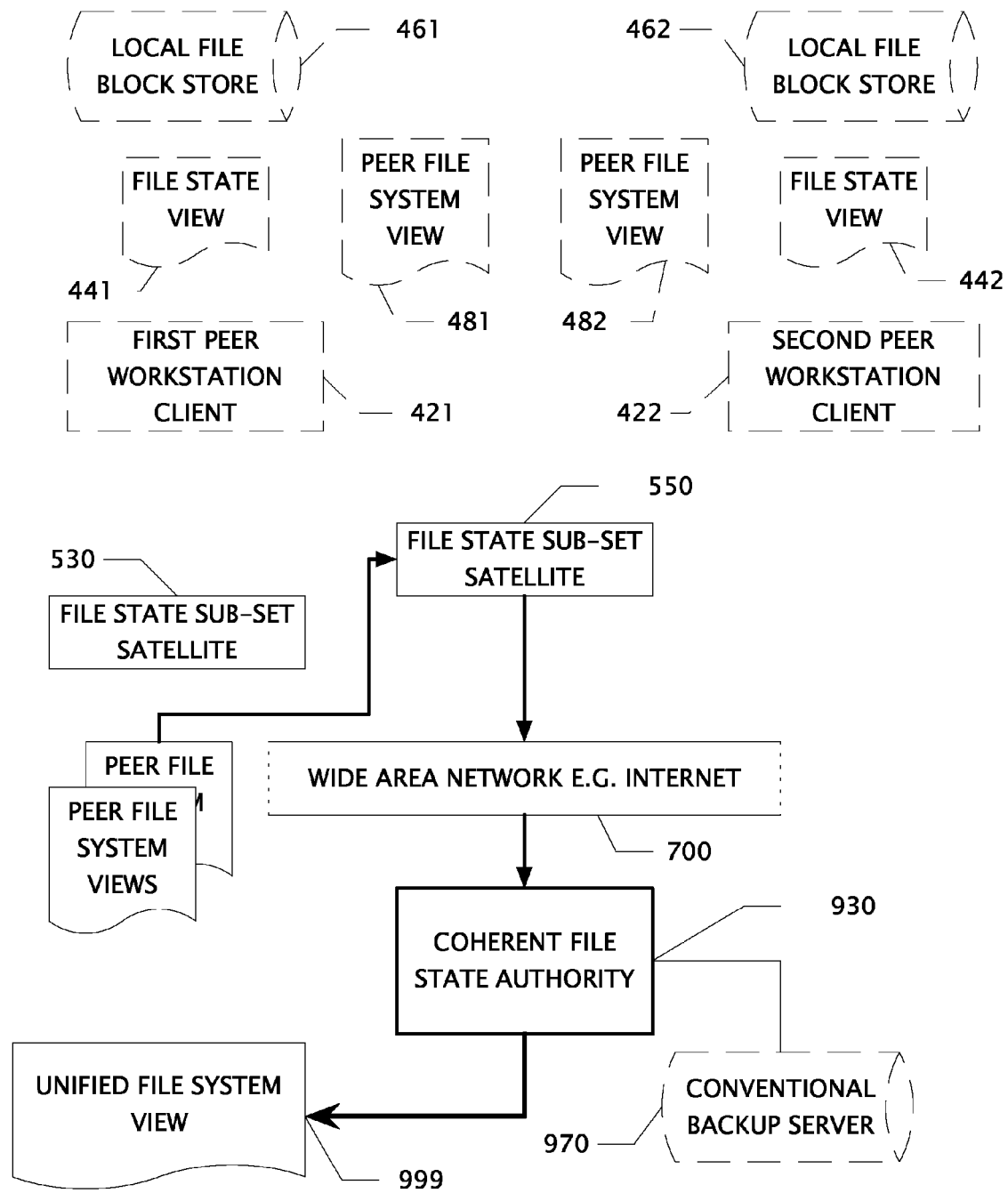
FIG. 18 is a block diagram of a sub-set satellite communicatively coupled to a coherent file state authority apparatus.

Referring now to FIG. 18, an objective of the invention is to prevent congestion at the coherent file state authority apparatus which would affect all workstation clients by excessive latency in obtaining files. Toward this end, the coherent file state authority externally is perceived as a write only store and it is optimized to receive, transform, and store metadata; and enhance its ability to stay in synch with every file state view in the system without causing a bottleneck. In an embodiment, a plurality of file state sub-set satellite apparatuses 530-550 are communicatively coupled to a coherent file state authority apparatus 930 through a network 700. Each file state sub-set satellite apparatus reads and transmits a plurality of peer file system views which it has received from a plurality of peer workstation client apparatuses. Among these peer file system views are file state views which are accurate and up-to-date with respect to certain versions of files at certain workstation clients. As a result, the coherent file state authority apparatus 930 receives individual updates to metadata for every version of each file at the plurality of workstation clients. The coherent file state authority apparatus integrates, transforms, and maintains a unified file system view 999 of all of the versions of all of the files at all of the peer workstation clients. This comprises the metadata of which blocks make up every version of every file in the coherent file system. Applicant defines a file system view to be metadata about files and file blocks but not the file blocks themselves. To support this distinction, applicant illustrates a conventional backup server 970 coupled to the coherent file state authority to provide storage of every file block.

Figure 19:
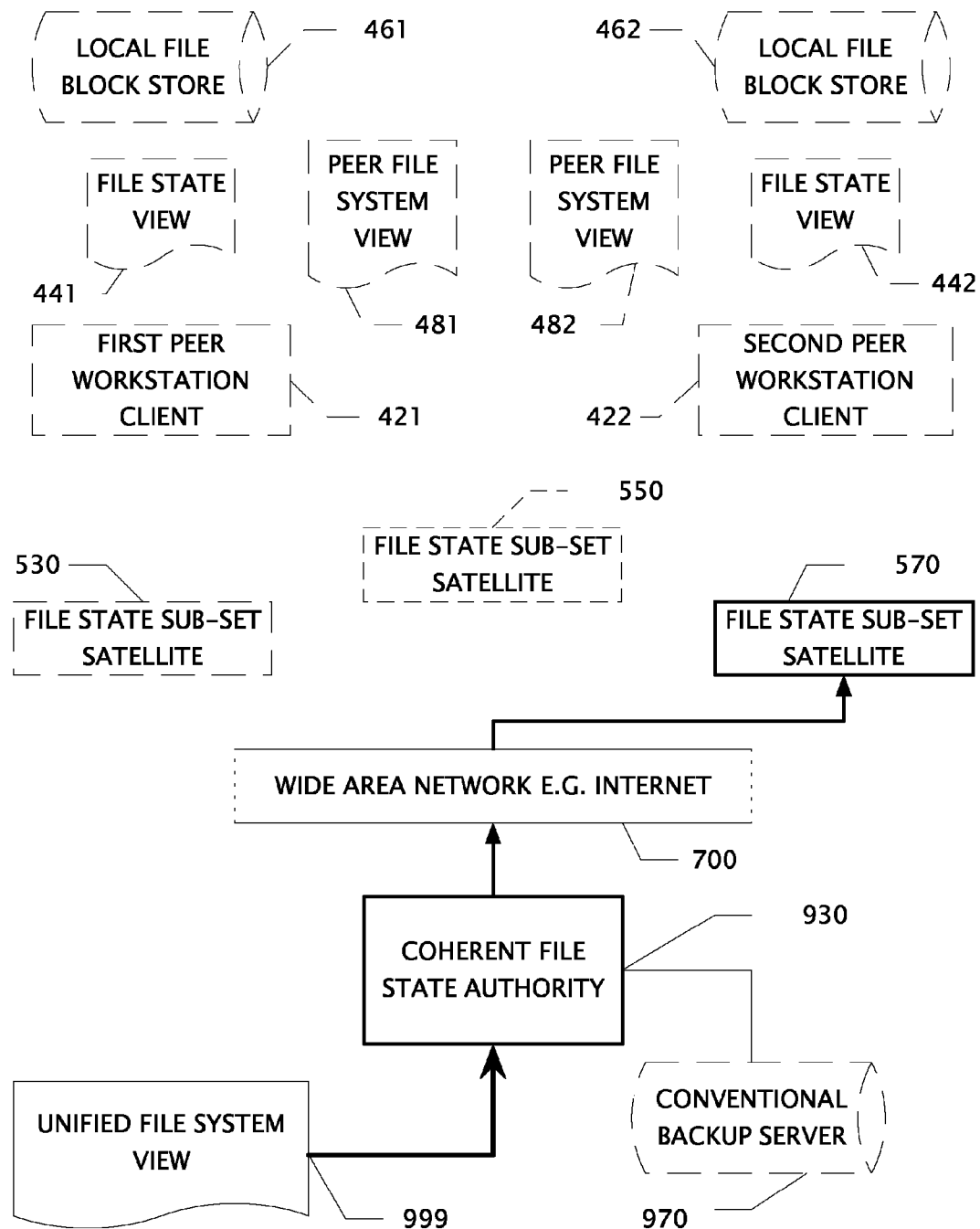
FIG. 19 is a block diagram of a coherent file state authority apparatus communicatively coupled to a newly installed or recovered sub-set satellite apparatus for configuration.

Referring now to FIG. 19, in an embodiment, the coherent file state authority may be relied upon for disaster recovery, network outage, or when a new file state sub-set satellite is installed. In this restoration or initialization mode, the method for operating a coherent file state authority apparatus 930 comprises establishing communication with a file state sub-set satellite apparatus 570 through a network 700, reading and transmitting stored metadata for directories and sub-directories of the file system view 999, and reading and transmitting file blocks from conventional backup server 970 to fulfill said metadata either to said file state sub-set satellite or to any workstation clients coupled to the newly restored or initialized file state sub-set satellite.

Conclusion

The present invention is easily distinguished from peer-to-peer distribution systems that increase rather than decrease unnecessary network traffic and congestion by broadcasting or pushing files, checksums, authentication codes, or notifications.

The present invention is easily distinguished from conventional network file systems and source code control solutions by its coherent file state authority which tracks every version of every managed file and its plurality of network attached workspace client apparatuses which respond to requests for randomly accessible blocks of files among themselves. It can be appreciated that that a conventional network file system has no concept of disjoint file views where each user may be concerned with using a plurality of versions of a file in parallel.

It is distinguishing characteristic that file blocks and files are not "pushed" to subscribers which would increase traffic and unnecessary congestion on the network. File blocks are only transmitted upon request. Only metadata about file blocks and new versions are "pushed" to a file state sub-set satellite or to a coherent file state authority when a new version is generated at each workstation client. Among workstation clients, such metadata is only transmitted upon request.

It is a distinguishing characteristic that workspace clients respond to requests for randomly accessed data blocks rather than whole file transfers and that workspace clients request metadata about the file blocks of a version of a file from a file state view before fulfilling data reads with locally stored file blocks. It is a distinguishing characteristic that the present invention does not compute a checksum or authentication code for an entire file assembled from parts provided by distributed storage. It is a distinguishing characteristic that the present invention does not integrate an entire file from file blocks. It is a distinguishing characteristic that the present invention does not disclose new ways to determine if a version of a file is newer or more current than another version or if they are the same, or if the file has been corrupted in transmission. The present invention reduces congestion and minimizes latency in enabling access to a desired file block of any version of any file committed into the coherent file system.

The techniques described herein can be implemented in digital electronic circuitry, or in computer hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

A number of embodiments of the invention have been described. Nevertheless, it will be understood that various modifications may be made without departing from the spirit and scope of the invention. For example, other network topologies may be used. Accordingly, other embodiments are within the scope of the following claims.

We claim:

1. A system comprising a first peer workstation client apparatus communicatively coupled to at least one other peer workstation client apparatus, each workstation client apparatus comprising:
   a processor configured by computer executable instructions to store, retrieve, and transform data and to track versions of files which are made up of file blocks and to intercept file block read and file block write commands issued by a program product;
   a file state view circuit configured to create, store, and retrieve metadata about file blocks, the versions of files that each block is a component of, and the location of each block in a local file block store whereby file blocks that are identical in multiple versions of a file are not redundantly stored;
   the local file block store for all file blocks that comprise versions of files whose metadata is stored in the file state view circuit, coupled to both the processor and to the file state view circuit;
   and
   at least one peer file system view circuit, whereby each peer file system view circuit stores and provides metadata previously received from other peer workstation client apparatuses
   about each file block previously stored in the file block store of each other peer, the version of the files each file block was previously a component of, and all the versions of all the files which were previously accessible to the other peer workstation client apparatus, and
   the location of each file block in the local file block store of the peer workstation client apparatus.

2. The system of claim 1 further comprising:
   a first file sub-set satellite apparatus communicatively coupled to a plurality of workstation client apparatuses,
   the file sub-set satellite apparatus comprising a store for peer workstation file system view metadata about each file block, the versions of files it is part of, and the location of the file block in a local store of a peer workstation client apparatus.

3. The system of claim 2 further comprising:
   at least one other sub-set satellite apparatus communicatively coupled to said first sub-set satellite apparatus;
   wherein said other sub-set satellite apparatus is communicatively coupled to a second plurality of workstation client apparatuses without shared membership in said first plurality of workstation client apparatuses.

4. The coherent file system of claim 3 further comprising:
   a coherent file state authority apparatus communicatively coupled to a plurality of file state sub-set satellite apparatuses through a network, the coherent file state authority apparatus further coupled to a conventional backup server, and the coherent file state authority apparatus comprising logic circuits and storage to archive a plurality of peer file state views which mirror the file state views of all peer workstation clients in communication with any file state sub-set satellite.

5. A method of operation across a plurality of peer workstation client apparatuses in a coherent file system to minimize network traffic, the method comprising:
   at a first peer workstation client apparatus,
      intercepting a file block read command from an application configuring the first peer workstation client apparatus;
      requesting metadata from a file state view circuit configured to create, store, and retrieve metadata about file blocks, the version(s) of file(s) that each file block is a component of, and the location of each file block;
   on the condition that the requested file block is stored in a local file block store,
      accessing the local file block store for a file block that comprise a version of a file whose metadata is stored in the file state view circuit, and
      fulfilling the file block read without network traffic;
   on the condition that the requested file block is not stored in the local file block store,
      requesting metadata from a peer file state view circuit about file blocks, the versions of files that each file block is a component of, and the location of each file block at a second local file block store at a second peer workstation client apparatus;

on the condition that the requested file block is stored in a second local file block store at a second peer workstation client apparatus,
  transmitting a request over a network,
  fulfilling the file block read with the response,
  storing the response to the first local file block store and updating the first file state view;
on the condition that the requested version of the file block is not found in either the first file state view or the first peer file system view,
  transmitting a request to at least one other peer workstation client apparatus for metadata about a directory or sub-directory of files and
  updating the first peer file system view with the response, whereby metadata about file blocks, their relation to file versions, and their locations is transmitted from a second peer workstation client apparatus only upon request from a first peer workstation client apparatus.

6. The method of claim 5 further comprising:
at a second peer workstation client apparatus communicatively coupled to a first peer workstation client apparatus,
  receiving a request for metadata about a version of a file stored at the second peer workstation client apparatus,
  retrieving from a second file state view the requested metadata about all the file blocks of all the versions of a file stored at the second peer workstation client apparatus, and
  transmitting to the first peer workstation client apparatus the requested metadata about all the file blocks stored at the second peer workstation apparatus, the file version or versions to which file block relates, and each file block's location, whereby network traffic and congestion is minimized by providing metadata about file blocks and versions only upon request.

7. The method of claim 6 further comprising:
updating both the file system view and the peer file system view of the first peer workstation client apparatus and the second peer workstation client apparatus whereby they are mutually coherent in file system state wherein file system state is the metadata describing the version(s) of each file, the file blocks that make up each version, and the location(s) of each file block.

8. A method for operating a first file state sub-set satellite apparatus communicatively coupled to a second file sub-set satellite apparatus, the method comprising:
  receiving a request for metadata about a directory or sub-directory of files,
  reading from a plurality of stored peer file system views the metadata which identifies the location of each file block that makes up each version of the requested directory or sub-directory of files,
  transmitting the requested metadata to the second file sub-set satellite apparatus,
  requesting from the second file sub-set satellite apparatus metadata about another directory or sub-directory of files, and
  updating the peer file system views stored at the first file sub-set satellite apparatus.

9. The method for operating a first file sub-set satellite apparatus communicatively coupled to a workstation client apparatus of claim 8 further comprising:
  receiving a request for metadata about a directory or sub-directory of files,
  reading from a plurality of stored peer file system views the metadata which identifies the location of each file block that makes up each version of the requested directory or sub-directory of files which it received from another file state sub-set apparatus, if not found, requesting from another file sub-set satellite apparatus metadata about said directory or sub-directory of files, and transmitting the requested metadata and location of the requested file block to the requesting workstation client apparatus.

10. The method for operating the file state sub-set satellite apparatus of claim 8 further comprising:
  establishing communication through a network with a coherent file state authority,
  reading a plurality of peer file system views from storage,
  transmitting metadata about files stored at a plurality of peer workstation clients communicatively coupled to the file state sub-set satellite to a coherent file state authority, and
  uploading file blocks required to fulfill the metadata to a conventional backup server accessible by the coherent file state authority.

11. The method for operating a coherent file system of claim 10, the method further comprising:
  receiving from a file state sub-set satellite metadata about a plurality file blocks which make up a version of a file at one of the plurality of workstation clients, transforming the metadata to integrate a coherent file state view for every version of said file at every workstation client;
  storing said coherent file state view into a coherent file system view of every version of every file at any workstation client, and requesting a file block referenced by the metadata to be stored in conventional backup server storage.

12. The method for operation of a coherent file system of claim 11 further comprising:
  at the coherent file state authority apparatus,
    reading metadata about a directory or sub-directory of files from file system view store,
    transmitting said metadata about each file block of each version of each file to a file state sub-set satellite apparatus, whereby a conventional backup server reads upon request each file block necessary to fulfill any request for a file block of the file state sub-set metadata transmitted to the file state sub-set satellite, and transmits the requested file blocks to the file state sub-set satellite.

13. A method for operation of a first file state sub-set satellite apparatus communicatively coupled to a plurality of peer workstation clients, the method comprising:
  passively monitoring data communications between a first peer workstation client and a second peer workstation client;
  recording peer file system view metadata as it is transmitted among peer workstation clients;
  storing into non-transitory media a plurality of peer file system view metadata on file blocks, the versions of files the file blocks are part of, and the location of each file block in the local store of each peer workstation client; and
  responding to a request from a second file state sub-set satellite apparatus for metadata about file blocks, file versions, and locations of file blocks in a directory or sub-directory requested by one of the peer workstation clients communicatively coupled to the second file state sub-set satellite apparatus.

14. The method of claim 13 further comprising steps for operation of a file state sub-set satellite apparatus communicatively coupled to a coherent file state authority apparatus, the method comprising:

reading at least one stored peer file system views which it has received from a peer workstation client apparatus;
transmitting to a coherent file state authority apparatus up-to-date metadata with respect to file block of certain versions of files and their locations at certain workstation clients; and at said coherent file state authority apparatus,
integrating, transforming, and maintaining a unified file system state of all file blocks of the versions of all of the files and their location at all of the peer workstation clients.

* * * * *